United States Patent
Nakamura

[19]

[11] Patent Number: 5,982,447
[45] Date of Patent: Nov. 9, 1999

[54] SYSTEM AND METHOD FOR COMBINING TWO DATA STREAMS WHILE MAINTAINING THE CONTINUOUS PHASE THROUGHOUT THE COMBINED DATA STREAM

[75] Inventor: Kazuyuki Nakamura, Kanagawa, Japan

[73] Assignee: Sony Corporation, Tokyo, Japan

[21] Appl. No.: 08/763,895

[22] Filed: Dec. 11, 1996

[30] Foreign Application Priority Data

Dec. 13, 1995 [JP] Japan ................................. 7-324814

[51] Int. Cl.⁶ .................................................. H04N 9/475
[52] U.S. Cl. ........................... 348/515; 348/513; 360/13; 369/83
[58] Field of Search .................................. 348/515, 513; 386/52, 54, 65, 66, 46, 95, 96, 98, 55; 360/18, 20, 13; 704/278; 369/83, 84

[56] References Cited

U.S. PATENT DOCUMENTS

| | | | |
|---|---|---|---|
| 4,249,218 | 2/1981 | Davis et al. | 360/13 |
| 4,333,152 | 6/1982 | Best | 345/327 |
| 4,351,007 | 9/1982 | Youngquist et al. | 360/13 |
| 4,591,926 | 5/1986 | Gaskell et al. | 360/13 |
| 4,743,981 | 5/1988 | Spencer et al. | 386/96 |
| 4,758,908 | 7/1988 | James | 360/61 |
| 4,768,106 | 8/1988 | Ito et al. | 386/56 |
| 4,772,959 | 9/1988 | Amano et al. | 360/8 |
| 4,772,966 | 9/1988 | Sharples et al. | 386/66 |
| 4,961,116 | 10/1990 | Kanamaru et al. | 386/99 |
| 5,012,352 | 4/1991 | Yoshimura et al. | 386/98 |
| 5,040,081 | 8/1991 | McCutchen | 386/66 |
| 5,097,364 | 3/1992 | Goto | 360/32 |
| 5,119,242 | 6/1992 | Murray | 386/66 |
| 5,146,448 | 9/1992 | Adachi et al. | 369/83 |
| 5,402,275 | 3/1995 | Nishido | 360/51 |
| 5,530,599 | 6/1996 | Sekigawa | 360/26 |
| 5,541,781 | 7/1996 | Barr et al. | 386/66 |
| 5,557,423 | 9/1996 | Phillips et al. | 386/96 |
| 5,598,352 | 1/1997 | Rosenau | 345/302 |
| 5,636,073 | 6/1997 | Yamamoto et al. | 360/13 |
| 5,642,171 | 6/1997 | Baumgartner | 348/515 |
| 5,737,479 | 4/1998 | Fujinami | 386/95 |

FOREIGN PATENT DOCUMENTS

0176324A1  4/1986  European Pat. Off. .

*Primary Examiner*—John K. Peng
*Assistant Examiner*—Stephen Thomas Boughner
*Attorney, Agent, or Firm*—Frommer Lawrence & Haug, LLP.; William S. Frommer

[57] ABSTRACT

A system and method for a generating a data stream for encoding by combining data from a multiple of sources. In order to maintain a continuous phase in the combined data stream, any phase differentials between the data supplied from the multiple sources are eliminated upon combination of the source data. The phase differential between the data from any two different sources is eliminated by trimming data from one of the sources such that when the trimmed data is combined with the data from the other source the resulting combined stream has a continuous phase.

18 Claims, 20 Drawing Sheets

SYSTEM AND METHOD FOR COMBINING TWO DATA STREAMS WHILE MAINTAINING THE CONTINUOUS PHASE THROUGHOUT THE COMBINED DATA STREAM

BACKGROUND OF THE INVENTION

1. Field of the Invention

The present invention relates to a data processing apparatus for and a data processing method of encoding dividing information data supplied together with a reference timing with a plurality of sources being successively switched, into data of a predetermined processing unit to encode them, and which are suitable for use in edition of data to be recorded on a digital video disk (DVD), for example.

2. Description of the Related Art

In a field of a digital audio data compression technique, a subband coding (SBC) system, an adaptive transform coding (ATC) system and so on are generally employed in order to reduce a data amount. A digital equipment for recording audio data thus coded on a recording medium, transmitting them to a transmission line or processing them may be increased in the future. In these coding systems, a digital audio data is divided into a block unit (audio frame unit) and then coded.

In the above subband coding system, an input audio signal is divided into signals of plural frequency bands and each of the divided signals of the plural frequency bands is independently coded by utilizing deviation of electric powers in each of the frequency bands. Specifically, the input audio signal is divided into the signals of plural subbands, which reduces deviation of a signal energy in each of the subbands, thereby a dynamic range being reduced. A bit corresponding to the signal energy of each of the subbands is allocated.

When the input audio signal is divided into the signals of the subbands, dichtomization of the frequency band is repeatedly carried out by using a plurality of orthogonal mirror filters (QMF), thereby the tree-structured subbands being obtained. Signal samples in the divided low frequency band and the divided high frequency band are thinned out to ½, thereby sampling frequencies thereof becoming a half.

In a transform coding system, an input audio signal is subjected to linear transformation for increasing concentration of electric power and then quantized, thereby a coding efficiency being improved. A transform coding allocating adaptively a bit is particularly called the adaptive transform coding system. Fourier transform, cosine transform or the like, for example, is employed as the above linear transform.

When the subband coding system or the adaptive transform coding system is employed, if a signal is quantized after being subjected to some weighting by using a psycho-acoustic characteristic so that deterioration of the signal in a band which human being can perceive should be minimum, then it is possible to further improve a total coding quality.

Psycho-acoustic weighting is a weighting method of sequentially calculating a temporal threshold value of an audible range by using an absolute threshold value thereof and a relative threshold value thereof determined by a masking effect. Bit allocation is carried out based on the above temporal threshold value.

A typical algorithm of an audio data coding system will be described in accordance with an algorithm of MPEG/Audio standard.

Initially, an input PCM audio data linearly quantized with 16 bits, for example, is converted from that of a time domain into signals of 32 frequency bands. A masking level for masking a quantization error based on the psycho-acoustic characteristic is calculated in order to allocate bits upon quantization.

The converted signals obtained as described above are quantized in accordance with the bit allocation based on the psycho-acoustic characteristic mode and then coded, thereafter being inserted into a frame together with a data which a user can arbitrarily define.

When the coded data is decoded, the data which a user can arbitrarily define is separated therefrom and the frame is deblocked and block data is decoded and inverse-quantized with reference to a supplied side information about the bit allocation. Then, the inverse-quantized signal is converted reversely to the coding processing, thereby the signal of the time domain being restored.

In the above MPEG/Audio standard, algorithm of three kinds, i.e., layer I, layer II and layer III are prescribed. In this case, while an algorithm becomes complicated in an order of the layer I, the layer II and the layer III, a sound quality is at the same time improved in the above order. The sound quality also depends upon a bit rate to be used. While bit rates of 14 kinds ranging from 32 kb/s to 448 kb/s, 384 kb/s and 320 kb/s are respectively prescribed for the layers I to III, respective target bit rates of the layers I to III are limited.

When, for example, the algorithm of the layer II is employed, as shown in FIG. 1, an audio data is processed by an audio frame unit (one audio frame unit includes 1152 samples according to the layer II) and thereby converted into coded audio data, i.e, a bit stream.

As a digital signal processing technique is developed recently, a digital video disk (DVD) for storing data of one movie amount in an optical disk (whose diameter is 120 mm) is developed. This DVD video disk is manufactured by multiplexing coded video data, coded audio data an coded attached information such as a superimposed dialogue or the like to record the multiplexed data on one optical disk. Fabrication of a master disk of this DVD video disk is called authoring.

When an audio data is encoded in a system for carrying out the authoring, if there is only one digital audio tape loaded onto an audio reproducing apparatus for reproducing an audio tape, then continuous processing of the audio tape from the head thereof makes encoded audio frames successive throughout.

If a plurality of digital audio tapes are loaded into the audio reproducing apparatus, then when a digital audio tape loaded into the audio reproducing apparatus is exchanged for another one, it is impossible to obtain a phase difference (offset) between an audio frame of an audio data reproduced from the previously loaded digital audio tape and the latest reference timing (video frame) thereof. Therefore, an audio frame of an audio data to be reproduced from a newly loaded digital audio tape and the audio frame of the previously loaded digital audio tape are prevented from becoming continuous.

Specifically, when the audio data is encoded, a plurality of audio samples as one processing unit (an audio frame) are calculated. Since the number of the audio samples to be encoded is set to a value which is convenient to the coding calculation, a frame period of the audio frame inevitably has no relation with a period of a processing unit of video data (a period of a video frame, i.e., a time code frame).

Therefore, if the audio data is encoded with the audio and video frames being not synchronized with each other, then the audio samples having the same time code value may be inserted into different audio frames depending upon the coding processing (i.e., reproducibility may be lacked)

This lack of reproducibility will specifically be described with reference to FIG. 2. When audio data of a tape TAPE1 and a tape TAPE2 are jointed, "a margin" where the same data are recorded is generally provided. It is assumed that audio data of the tape TAPE1 is switched to that of the tape TAPE2 at a start point P of a time code frame TN of the margin.

It is assumed that an audio frame including a data of a sound obtained when the tape TAPE1 at a point P is reproduced is an audio frame A1frame(N). It is assumed that an audio frame including a data of a sound obtained when the tape TAPE2 at the above point P is reproduced is an audio frame A2frame(N).

When the TAPE 2 is reproduced, a phase difference between the audio frame thereof and the time code frame is generally different from that between the time code frame and the audio frame obtained when the TAPE 1 is reproduced. In the example shown in FIG. 2, phase differences of the audio frames A1frame(N+1) and A2frame(N+1) with respect to the start point P are $\pi 1$ and $\pi 2$, respectively.

When the data streams obtained from the encoded audio data of the tapes TAPE1 and TAPE2 are jointed so that the audio frame A1frame(N) should be followed by the audio frame A2frame(N+1) to prevent the data at the start point P from being encoded twice, as shown in FIG. 2, two portions obtained by encoding the same audio data are repeatedly produced and further a time base shift of $\pi 1 - \pi 2$ is produced after the joint point of the tapes TAPE1 and TAPE2, which disables a correct decoding processing of a DVD player. Therefore, an authoring system carrying out such edition has a disadvantage.

Since $\pi 1 > \pi 2$ is established in the example shown in FIG. 2, the same data is encoded twice, which leads to a backward shift of time base. If $\pi 1 < \pi 2$ is established, then some audio data is not encoded, which leads to a forward shift of time base.

In order to make audio frames of different tapes continuous, two methods can be considered: a first method of previously storing a plurality of audio data in some suitable means to thereafter edit them so that all the audio frames should be continuous; and a second method of dividing an audio data at a silent portion whose data may be encoded twice or removed if audio frames of different tapes are not aligned.

If the first method is employed, then a memory having a large capacity is required disadvantageously. If the second method is employed, then it is not practical because there is no ground that a silent portion is regularly produced on a tape.

SUMMARY OF THE INVENTION

In view of the above aspects, it is an object of the present invention to provide a data processing apparatus and a data processing method which, when information data supplied together with a reference timing while a plurality of sources are switched is divided into data of predetermined processing units and then encoded, can keep the processing units used for encoding continuous at a source switch point and allow the source to be divided at an optional point regardless of whether the point is a silent portion (i.e., which can satisfy $\pi 1 = \pi 2$ described in the example shown in FIG. 2).

It is another object of the present invention is to provide a data processing apparatus and a data processing method which allow an optional processing unit to be substituted for an optional portion of a group of continuous processing units and hence can realize various kinds of data processing functions.

According to a first aspect of the present invention, a data processing apparatus according to the present invention has an encoding processing means which is supplied with information data from a plurality of sources together with a reference timing having time information while the plurality of sources are switched and divides the information data into data of predetermined processing units to encode the divided data. The data processing apparatus includes a timing numeric-representing means for converting the reference timing and a start timing of each of processing units corresponding to the reference timing into numerical values based on the time information reference means, a phase-difference calculating means for calculating a phase difference between a reference timing of a new source after being switched and a start timing of a processing unit thereof based on a numerical information from the timing numeric-representing means, a trimming means for trimming information data of the new source from a start point of the information data thereof to a start timing of the processing unit based on information of the phase difference, and a processing unit outputting unit for outputting the trimmed information data to the encoding processing means by a processing unit.

According to a second aspect of the present invention, a data processing method according to the present invention is a method of dividing information data supplied together with a reference timing having time information while a plurality of sources are switched, into data of predetermined processing units to encode the divided data. The data processing method includes a timing numeric-representing step of converting the reference timing and a start timing of each of processing units corresponding to the reference timing into numerical values based on the time information reference means, a phase-difference calculating step of calculating a phase difference between a reference timing of a new source after being switched and a start timing of a processing unit thereof based on a numerical information obtained in the timing numeric-representing step, a trimming step of trimming information data of the new source from a start point of the information data thereof to a start timing of the processing unit based on information of the phase difference, and a processing unit outputting step of outputting the trimmed information data by a processing unit for the encoding processing.

According to the present invention, if information data supplied from two different sources are divided into data of processing units and encoded, then initially the timing numeric-representing means (or the timing numeric-representing step) converts the reference timing having time information supplied together with the information data and the start timings of the processing unit corresponding to the reference timing into numerical values.

The phase-difference calculating means (or the phase-difference calculating step) (or step) calculates the phase difference of the new source between the reference timing and the start timing of the processing unit thereof based on the numerical information supplied from the timing numeric-representing means.

Specifically, when the information data is fetched from the source, the reference timing supplied together with the information data is read and the timing numeric-representing means (or the timing numeric-representing step) converts this fetched reference timing into numerical values. At this time, the start timings of the processing units of the information data supplied from the source are simultaneously converted into numerical values.

Based on the numerical information about the reference timing supplied from the timing numeric representing means (or the timing numeric representing step) and the numerical information of the start timing of the processing timing supplied therefrom, the phase-difference calculating means (or the phase-difference calculating step) calculates the phase difference between the reference timing and the start timing as a numerical information.

The trimming means (or the trimming step) at the succeeding stage trims the information data from the start point of the above information data of the new source to the start timing of the above processing unit. As a result, a new start point of the information data trimmed by the trimming means (or the trimming step) is synchronized with the start timing of the processing unit.

Therefore, the processing unit outputting means (or the processing unit outputting step) at the succeeding stage outputs the trimmed information data to the encoding processing means. In this case, the processing unit of the information data of the new (second) source is continuously connected next to the processing unit of the information data of the source (first source).

In particular, when the processing unit outputting means (or the processing unit outputting step) outputs to the encoding processing means by a processing unit the information data after the start timing next to the start timing of the processing unit corresponding to the source switch point of the information data trimmed by the trimming means, if the last processing unit of the information data of the first source is the Nth processing unit, then the (N+1)th processing unit included in the information data of the second source is continuously connected to the Nth processing unit thereof.

The present invention is not limited to the above-mentioned example of successively outputting the information data from the first source and the information data from the second source to the encoding processing means. In general, since the respective information data from a plurality of sources can be output to the encoding processing means by a processing unit uniformly determined by the reference timing having time information and supplied together with the information data, the encoded data blocks having the same time information are generated from data of a constant phase with respect to the reference timing. Therefore, according to the present invention, it becomes unnecessary to process a plurality of sources successively in an order and it is possible to process a plurality of sources in an optional order.

According to the present invention, even if a part of the source is modified or changed, then it is possible t continuously connect the information data of an optional processing unit by replacing the part of the source with a corresponding processed block.

DESCRIPTION OF THE PREFERRED EMBODIMENT

Figure 3:
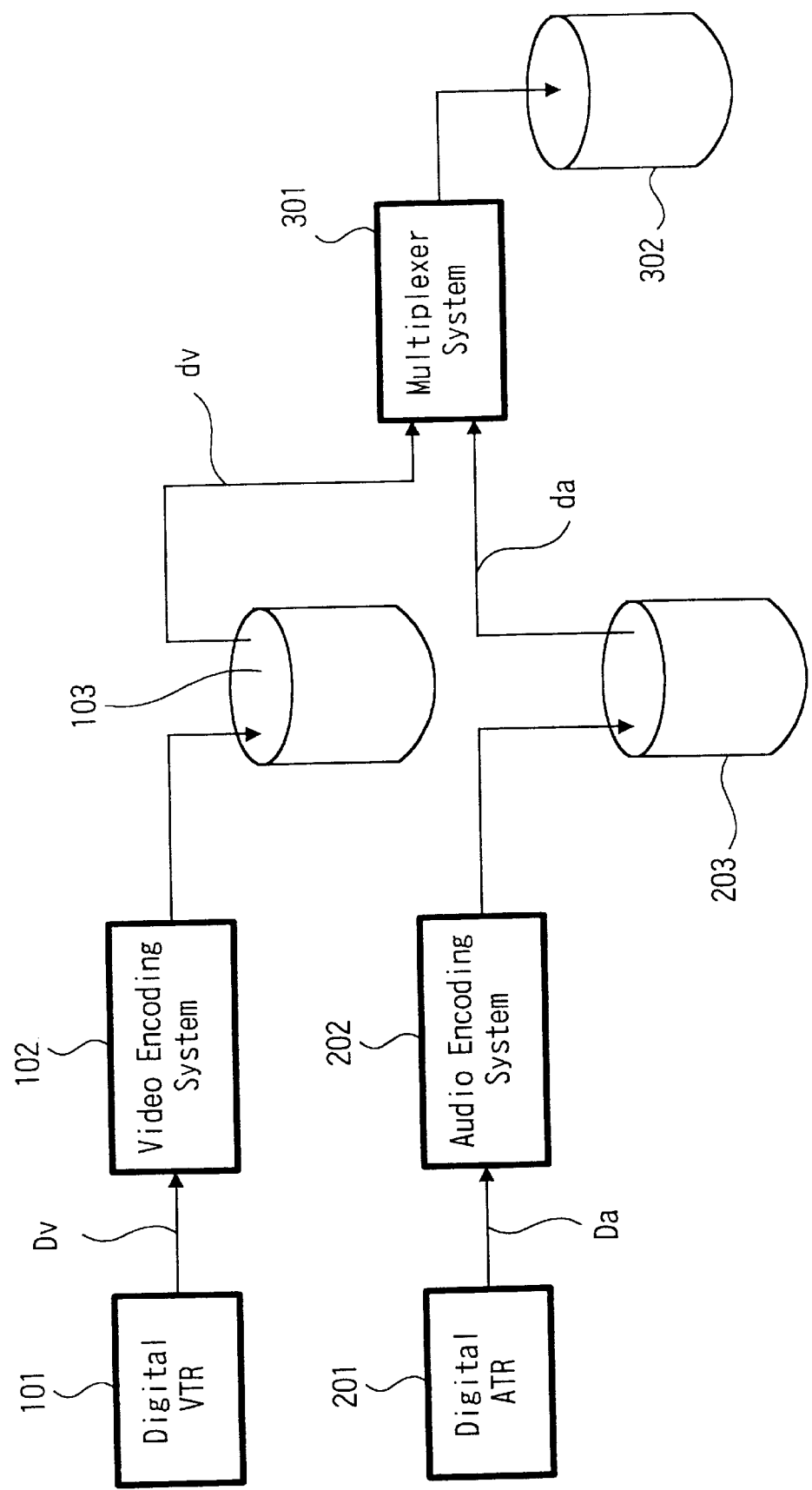
FIG. 3 is a diagram showing an example of an arrangement of an authoring system (DVD editing system) employing an encoder for simultaneously encoding a video data and an audio data.

FIG. 3 is a diagram showing an arrangement of a DVD video disk authoring system for independently encoding video data and audio data to multiplex both of the video data and the audio data, by way of example. The authoring system has at least a video data processing system and an audio data processing system.

The video data processing system has a digital video tape recorder (digital VTR) 101, a video encoder system 102 and a video encoded data recording medium 103. The audio data processing system has a digital multi audio tape recorder (digital multi ATR) 201, an audio encoding system 202 and an audio encoded data recording medium 203.

The above authoring system has, other than the above video data processing system and the above audio data processing system, a multiplexer system 301 for multiplexing encoded data from both the video data processing system and the audio data processing system and a master stream recording medium 302.

The above digital VTR 101 reproduces digital video data from a video tape digitally recorded. The digital multi ATR 201 reproduces digital audio data from an audio tape digitally recorded. A time code as a common time information is recorded on a portion where the same program is recorded on each of the video tape and the audio tape. The digital VTR 101 and the digital multi ATR 201 reproduce the time code together with the video and audio data, respectively.

The video encoder system 102 encodes a video data Dv from the above digital VTR 101 and records the encoded data on the video coded data recording medium 103 at the succeeding stage. The audio encoder system 202 encodes an audio data Da from the above digital multi ATR 201 and records the encoded data on the audio coded data recording medium 203 at the succeeding stage.

The multiplexing system 301 reads a video coded data dv recorded on the video coded data recording medium 103 and an audio coded data da recorded on the audio coded data recording medium 203 and multiplexes them to record them on the master stream recording medium 302 at the succeeding stage.

Specifically, in the above authoring system, reproduced data from the digital VTR 101 and so on, e.g., the video data Dv and the audio data Da in the above arrangement, are encoded and converted into data of a predetermined data rate, thereafter being arranged in a predetermined format and recorded on a recording medium such as an optical disk or the like.

Figure 4:
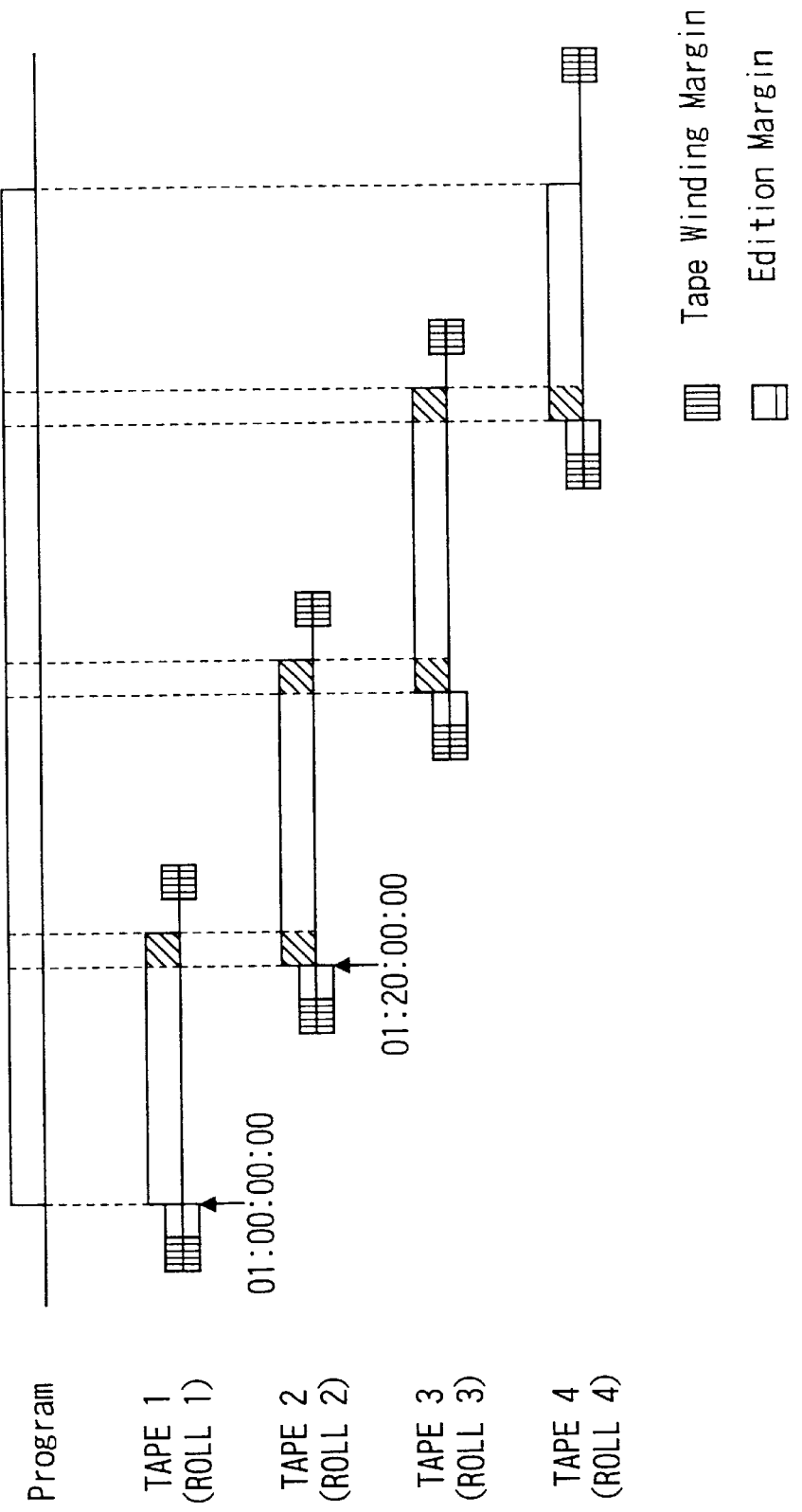
FIG. 4 is a diagram used to explain a tape format employed when a plurality of master tapes are used.
Figure 5:
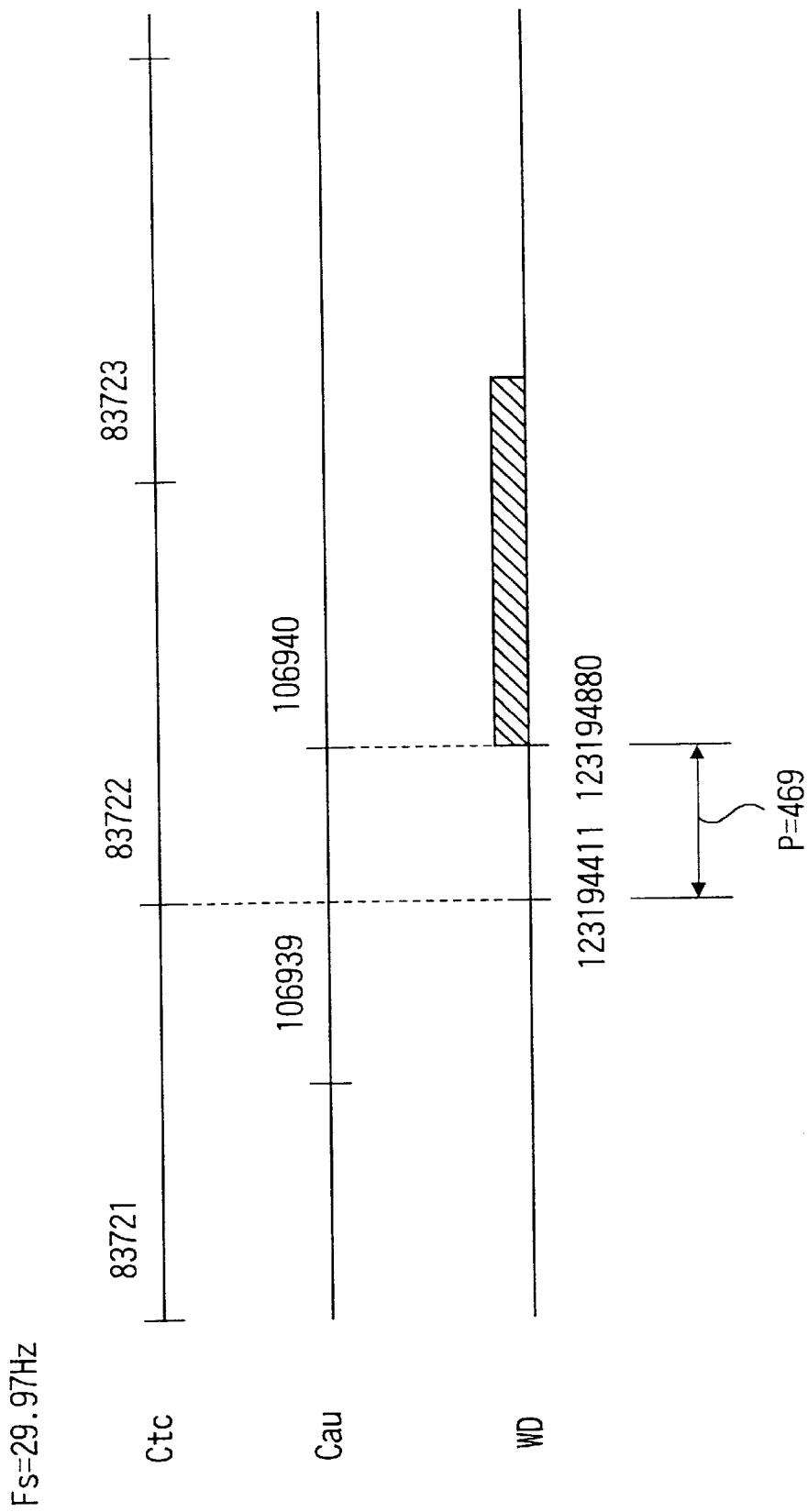
FIG. 5 is a timing chart for a time code frame, an audio frame and audio sample values of both frames supplied from a digital ATR.

Before an encoding apparatus according to this embodiment being described, an arrangement and a timing of an audio data handled by the encoding apparatus according to this embodiment will be described with reference to FIGS. 4 to 6.

Figure 6:
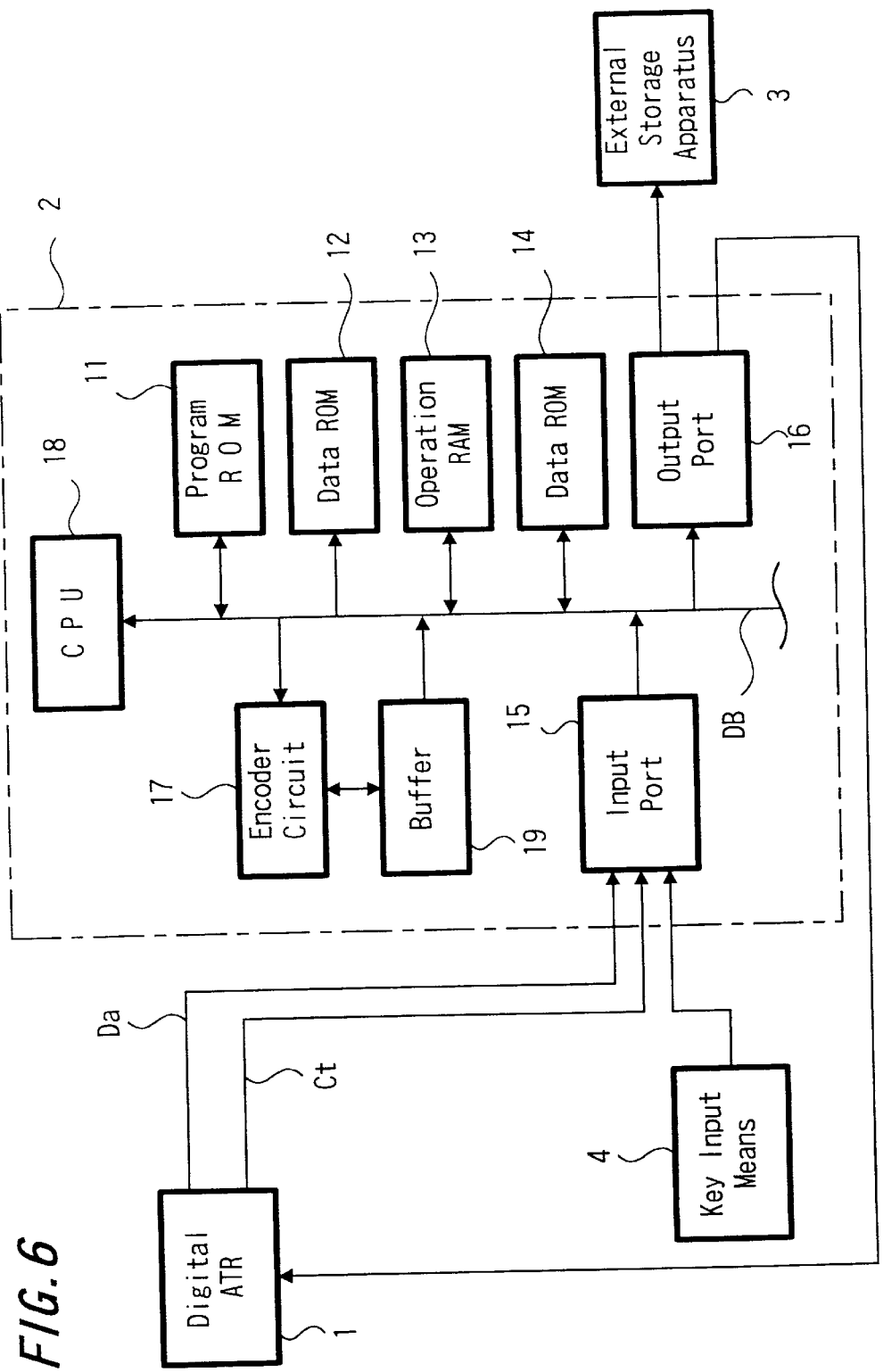
FIG. 6 is a diagram showing an arrangement of an encoding apparatus to which a data processing apparatus according to the present invention is applied.

As shown in FIG. 6, the audio data is an audio data Da from an digital ATR 1 for reproducing an audio data recorded on a magnetic tape, for example. Particularly, the digital ATR 1 outputs time information indicative of a count value of a frame or a field of the video data, i.e., a time code Ct.

Usually, the digital ATR 1 has audio output terminals of the large number of channels (e.g., 8 channels), and outputs the audio data Da from all the audio terminals to an encoding apparatus 2 in parallel. Therefore, the encoding apparatus 2 is input with the audio data Da of 8 channels in parallel and encodes these audio data Da of 8 channels at the same time. However, in order to simply describe the arrangement and timing of the audio data Da, the arrangement and timing thereof will hereinafter be described on the assumption that there is the audio data Da of one channel amount and that a timing for counting the time code Ct is synchronized with the frame of the video data.

The above audio data Da is formed of successive data sampled with a predetermined sampling frequency. One sampling data is formed of 16 bits, for example. In this embodiment, this 16-bit sampling data is defined as one audio sample (sometimes simply referred to as a sample) WD.

The encoding apparatus 2 employs an encoding algorithm according to the MPEG/Audio (Layer II type) standard. As a result, an audio frame Cau which is an encoding processing unit of this encoding apparatus is formed of 1152 samples (1152 sampling data). Therefore, relationship between the audio frame Cau and the audio sample WD is expressed by the following equation 1.

$$1 \text{ audio frame} = 1152 \text{ samples} \quad (1)$$

A frame frequency of the time code Ct recorded by the digital ATR 1 is different depending upon a kind (standard) of a video data. When a video data of NTSC (B/W) system is recorded, for example, the time code Ct is generated in accordance with a SMPTE (Society of Motion Picture and Television Engineers)-NDF standard and its frame frequency Fs is 30 Hz. When a video data of NTSC (color) system is recorded, the time code Ct is generated in accordance with a SMPTE-DF standard and its frame frequency Fs is about 29.97 Hz. When a video data of PAL system is recorded, the time code Ct is generated in accordance with a EBU (European Broadcasting Union) standard and its frame frequency Fs is 25 Hz. A frame frequency Fs of Film is 24 Hz.

According to the present invention, since the time code is converted into a numerical value as a parameter so that a kind of the time code and the frame frequency should be prevented from influencing each other as described later on, it is possible to process the video data having a frame frequency of the NTSC (color) standard by using the time code of the SMPTE-NDF standard, for example.

Since the above time codes Ct of various kinds are provided as a time information (e.g., 02:31:17:19), it is disadvantageous to process such time codes Ct as data. Therefore, in this embodiment, the time codes Ct is converted into a numerical value as a frame value by utilizing the following facts: that the time code Ct is synchronized with a frame timing of the video data; and that the time codes Ct are continuous and hence the kind and the frame frequency Fs thereof are not changed at the middle thereof.

When the time codes Ct are converted into numerical values, the time codes Ct are converted into numerical values with reference to a time when the audio data Da of the data supplied from the digital ATR 1 is actually supplied.

A plurality of master tapes (e.g., tapes TAPE1 to TAPE4) are usually used to record one program (digital audio data). In this case, a format shown in FIG. 4 is employed. A test signal or a silent portion is recorded on a portion of about one minute before a program of each master tape is started. A time code is recorded on each of the master tapes so as to indicate 01:00:00:00 at the program start point. In the example shown in FIG. 4, a time code indicating 01:00:00:00 is recorded at a start point of the master tape TAPE1 (a real start point of the program), a time code indicating 01:20:00:00 is recorded at a start point of the master tape TAPE2, a time code indicating 01:30:00:00 is recorded at a start point of the master tape TAPE3, and a time code indicating 01:40:00:00 is recorded at a start point of the master tape TAPE4.

Therefore, when the time code Ct is converted into a numerical value, the time code indicating 01:00:00:00 is set to 0 and the succeeding time codes are successively converted into numerical values (counted up). The arrangement and timing of the audio data Da will hereinafter be described on the assumption that the time code Ct converted into a numerical value is defined as "a time code frame Ctc".

It is assumed that the program start point (time code 01:00:00:00) is a start point (frame value=0) of the audio frame Cau and the succeeding audio frames Cau are counted up. Further, it is assumed that an audio sample value at the program start point (time code 01:00:00:00) is set to 0 and the succeeding audio sample values are counted up.

Equations for transforming the various kinds of time codes Ct to time codes Ctc are as follows.

SMPTE-NDF (Hour:Minute:Second:Frame);

$$108000 \times (\text{Hour}-1) + 1800 \times \text{Minute} + 30 \times \text{Second} + \text{Frame} \quad (2)$$

SMPTE-DF (Hour:Minute:Second:Frame);

$$107892 \times (\text{Hour}-1) + 1798 \times \text{Minute} + 30 \times \text{Second} + \text{Frame} + k \qquad (3)$$

where k=C×int(Minute/10) with C=2 and int(a) representing an integral portion of a.

PAL (Hour:Minute:Second:Frame);

$$90000 \times (\text{Hour}-1) + 1500 \times \text{Minute} + 25 \times \text{Second} + \text{Frame} \qquad (4)$$

Film (Hour:Minute:Second:Frame);

$$86400 \times (\text{Hour}-1) + 1440 \times \text{Minute} + 24 \times \text{Second} + \text{Frame} \qquad (5)$$

If specific values are substituted for corresponding terms of each of the equations 2 to 5, then the following equations are obtained.

SMPTE-NDF (02:31:17:19);

$$108000 \times (2-1) + 1800 \times 31 + 30 \times 17 + 19 = 164329$$

SMPTE-DF (02:31:17:19);

$$107892 \times (2-1) + 1798 \times 31 + 30 \times 17 + 19 + k = 164165$$

where k=C×int(31/10)=6.

PAL (02:31:17:19);

$$90000 \times (2-1) + 1500 \times 31 + 25 \times 17 + 19 = 136944$$

Film (02:31:17:19);

$$86400 \times (2-1) + 1440 \times 31 + 24 \times 17 + 19 = 131467$$

The above transformation is always that of one-to-one correspondence and hence an inverse transformation is similarly possible. Moreover, since the time code Ct provided as the time information is converted into numerical values and the time code frame Ctc as described above, it becomes possible to process data regardless of the kind of the time code Ct.

Since a frame period of the video data of the NTSC (B/W) system is 1/30 Hz[sec], one time code frame thereof includes 1470 audio samples WD having a time width of 1/44.1 kHz[sec]. Therefore, a relationship between one time code frame thereof and the audio samples WD thereof is expressed as follows.

NTSC (B/W) [30 Hz];

$$\text{one time code frame} = 1470 \text{ samples} \qquad (2')$$

NTSC (color) [≈29.97 Hz];

one time code frame=1471.47 samples (i.e., One hundred time code frames=147147 samples)   (3')

PAL [25 Hz];

one time code frame=1764 samples   (4')

Film [24 Hz];

one time code frame=1837.5 samples (i.e., two time code frames= 3675 samples)   (5')

Assuming that the time code frame and the sample value corresponding thereto are respectively represented by reference symbols A, B, a relationship between the time code frame and its sample value is expressed by the following equations 6 to 9.

NTSC (B/W) [30 Hz];

$$B = \text{int}(1470 \times A) \qquad (6)$$

NTSC (color) [≈29.97 Hz];

$$B = \text{int}(1471.47 \times A) \qquad (7)$$

PAL [25 Hz];

$$B = \text{int}(1764 \times A) \qquad (8)$$

Film [24 Hz];

$$B = \text{int}(1837.5 \times A) \qquad (9)$$

The following relationship between the time code frame Ctc and the audio frame Cau can be obtained from the relationship between the audio frame Cau and the audio sample WD (obtained from the equation 1) and the relationship between the time code frame Ctc and the audio sample WD (obtained from the equations 2' to 5').

NTSC (B/W) [30 Hz];

one time code frame:one audio frame

=1470:1152

=245:192   (10)

NTSC (color) [≈29.97 Hz];

one time code frame:one audio frame

=1471.47:1152

=147147:115200

=49049:38400   (11)

PAL [25 Hz];

one time code frame:one audio frame

=1764:1152

=49:32   (12)

Film [24 Hz];

one time code frame:one audio frame

=1837.5:1152

=3675:2304

=1125:768   (13)

A cycle of time when margins of the time code frame Ctc and the audio frame Cau are aligned with each other is as follows.

NTSC (B/W) [30 Hz]; 6.4 sec
NTSC (color) [≈29.97 Hz]; 1281.28 sec
PAL [25 Hz]; 1.28 sec
Film [24 Hz]; 29.39 sec Study of this cycle reveals that a start timing of the time code frame Ctc and a start timing of the audio frame Cau are seldom aligned with each other.

However, if it is assumed that a value of the time code frame Ctc and a value of the audio frame Cau are respectively represented by reference symbols X, Y, then the following equations 14 to 17 can be obtained from the above equations 6 to 9.

NTSC (B/W) [30 Hz];

$$Y=int(245x/192) \quad (14)$$

NTSC (color) [≈29.97 Hz];

$$Y=int(49049x/38400) \quad (15)$$

PAL [25 Hz];

$$Y=int(49x/32) \quad (16)$$

Film [24 Hz];

$$Y=int(1125x/768) \quad (17)$$

By using the above equations 14 to 17, it is possible to calculate from the time code frame Ctc with respect to the various time codes Ct the audio frame Cau corresponding to the above time code frame Ctc i.e., calculate therefrom the audio frame Cau including the audio data at the start point of the above time code frame Ctc (hereinafter such audio frame Cau will be simply referred to as a "corresponding" audio data Cau). For example, as shown in FIG. 5, when the video data of NTSC (color) [≈29.97 Hz] is employed, the audio frame Cau corresponding to the time code frame Ctc=83722 is int(49049×83722/38400)=106939.

This means that a start timing of a time code frame Ctc=83722 lies between start timings of an audio frame cau 106939 and an audio frame Cau=106940.

In this case, study of the equation 7 reveals that an audio sample value corresponding to the time code frame Ctc=83722 is the 123194411th sample. Study of the equation 1 reveals that an audio sample value corresponding to the audio frame Cau=106940 is the 123194880th sample. If a phase difference P between the time code frame Ctc=83722 and the audio frame Cau=106940 is expressed by the audio sample value, then it is 123194880−123194411=469 samples.

This means the possibility that the time code Ct is converted into the time code frame value (Ctc) and then the audio frame Cau included in the time code frame Ctc is detected from the time code frame value (Ctc), thereby the phase difference P between the time code frame value (Ctc) and the detected audio frame value (Cau) being calculated as the audio sample value.

Figure 1:
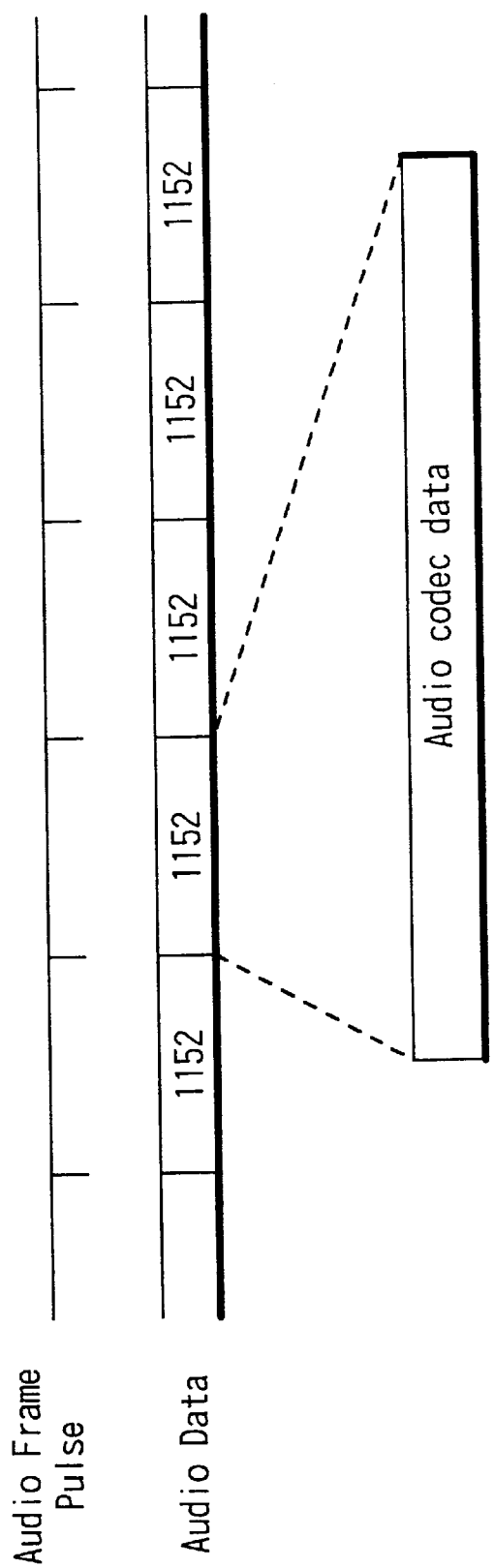
FIG. 1 is a diagram showing an arrangement of a bit stream obtained after an audio data is encoded.
Figure 2:
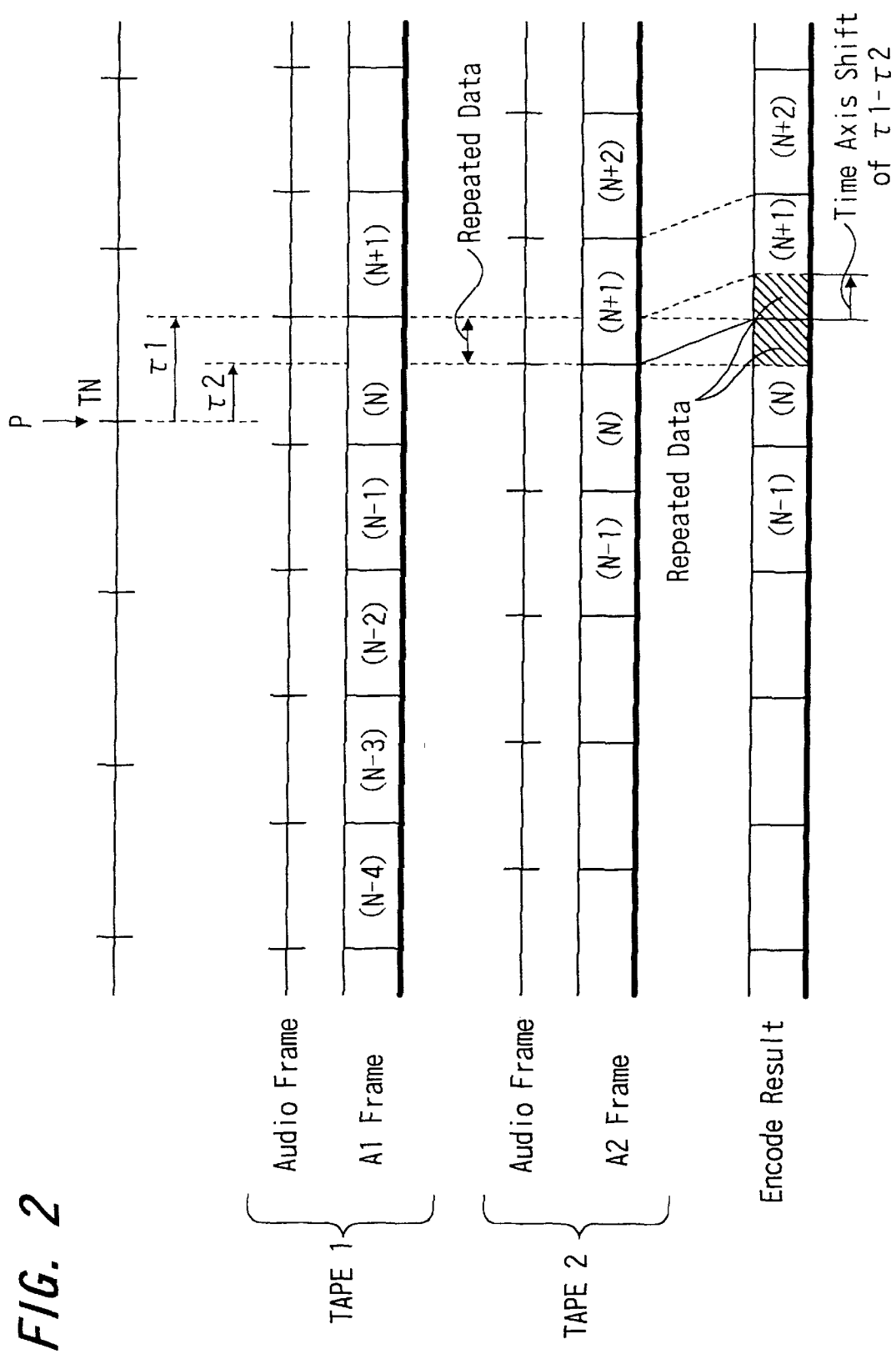
FIG. 2 is a diagram used to explain an example of lack of reproducibility.

For example, as shown in FIG. 2, when an audio data Da recorded on the first magnetic tape TAPE1 is encoded by a unit of the audio frame Cau and the audio data Da of the tape TAPE1 is ended at an Nth frame, the audio data Da recorded on the second magnetic tape TAPE2 is similarly encoded by a unit of the audio frame Cau. However, the audio data Da of the tape TAPE2 is usually a data prior to the Nth frame and its start point is synchronized with the time code Ct. Specifically, a start point of the audio data Da recorded on the second tape TAPE2 is not synchronized with the audio frame Cau.

Therefore, if a count operation of a counter for counting the number of the audio samples WD is started from the start point of the audio data Da recorded on the second tape TAPE2, i.e., if the audio data Da recorded on the second tape TAPE2 is framed in synchronization with an audio frame period of the audio data Da recorded on the first tape TAPE1, as shown in FIG. 2, data corresponding to an amount of the phase difference P between the time code Ct and the start point of the actual audio frame Cau (data of the Nth frame) is added at the head of the (N+1)the frame of the audio data Da recorded on the second tape TAPE2. Specifically, since the data (unnecessary data) of the Nth frame of the audio data Da recorded on the second tape TAPE2 is added between the audio data of the Nth frame recorded on the first tape TAPE1 and the actual audio data Da of the (N+1)the frame recorded on the second tape TAPE2, continuity of the audio frames Cau cannot be obtained.

However, if the data existing from the start point of the audio data Da recorded on the second tape TAPE2 and corresponding to the amount of the phase difference P between the time code Ct and the actual audio frame Cau at the succeeding stage is deleted and then the audio data Da after the deleted data portion is sequentially framed, i.e., if the count operation is started from the start point of the audio data Da obtained after the deletion, then the unnecessary data can be prevented from being added between the audio data of the Nth frame recorded on the first tape TAPE1 and the actual audio data Da of the (N+1)the frame recorded on the second tape TAPE2, which can keep the continuity of the audio frames Cau.

An encoding apparatus according to this embodiment in which the above-mentioned principle is realized as a practical encoding apparatus will be described with reference to FIGS. 6 to 20.

As shown in FIG. 6, the encoding apparatus 2 divides the audio data Da supplied from the digital ATR 1 into the unit of the audio frames Cau to encode the respective audio frames Cau. The encoding apparatus 2 supplies the encoded data to an external storage apparatus (e.g., a hard disk or the like) 3. The encoding apparatus 2 is formed mainly of a work station or a personal computer.

A specific hardware arrangement of the encoding apparatus 2 will be described with reference to FIG. 6. The encoding apparatus 2 has a program read-only memory (ROM) 11 (e.g., a semiconductor memory, an optical disk or the like) for storing various programs, a data ROM 12 for storing various fixed data previously registered, an operation random-access memory (RAM) 13 used to operate the program read from the above program ROM 11, a data RAM 14 for storing data from the digital ATR 1, a key input data (data from a key input means 4), data processed by various programs and so on, input and output ports 15, 16 respectively to and from which data is input from and output to external circuits (the digital ATR 1, the key input means 4, the external storage apparatus 3 and so on), an encoder circuit 17 for encoding the data stored in the data RAM 14 in accordance with the algorithm of the MPEG/Audio standard to record it in a predetermined area of the data RAM 14, and a CPU (a control unit and a logical unit) 18 for controlling these circuits and units in the encoding apparatus 2. The encoder circuit 17 encodes the supplied data before being encoded by using a buffer 19.

While this embodiment is described on the assumption that the encoder circuit is formed of a dedicated system (hardware), it is needless to say that the encoder circuit may be formed of some software. In this case, an encoding program is registered in the program ROM and a program for copying the encoding program stored in the program ROM to the operation RAM when the encoding program is started (e.g., when the encoding apparatus is energized) is registered in an operation system of the encoding apparatus.

As shown in FIG. 6, the respective circuits in the encoding apparatus 2 transmit and receive data through a data bus DB derived from the CPU 18, and also are controlled by the CPU 18 through an address bus and a control bus (either of which is not shown) derived from the CPU 18.

The key input data from the key input means 4 and the audio data Da and the time code Ct from the digital ATR 1 are supplied through the input port 15 to the data bus DB.

Figure 7:
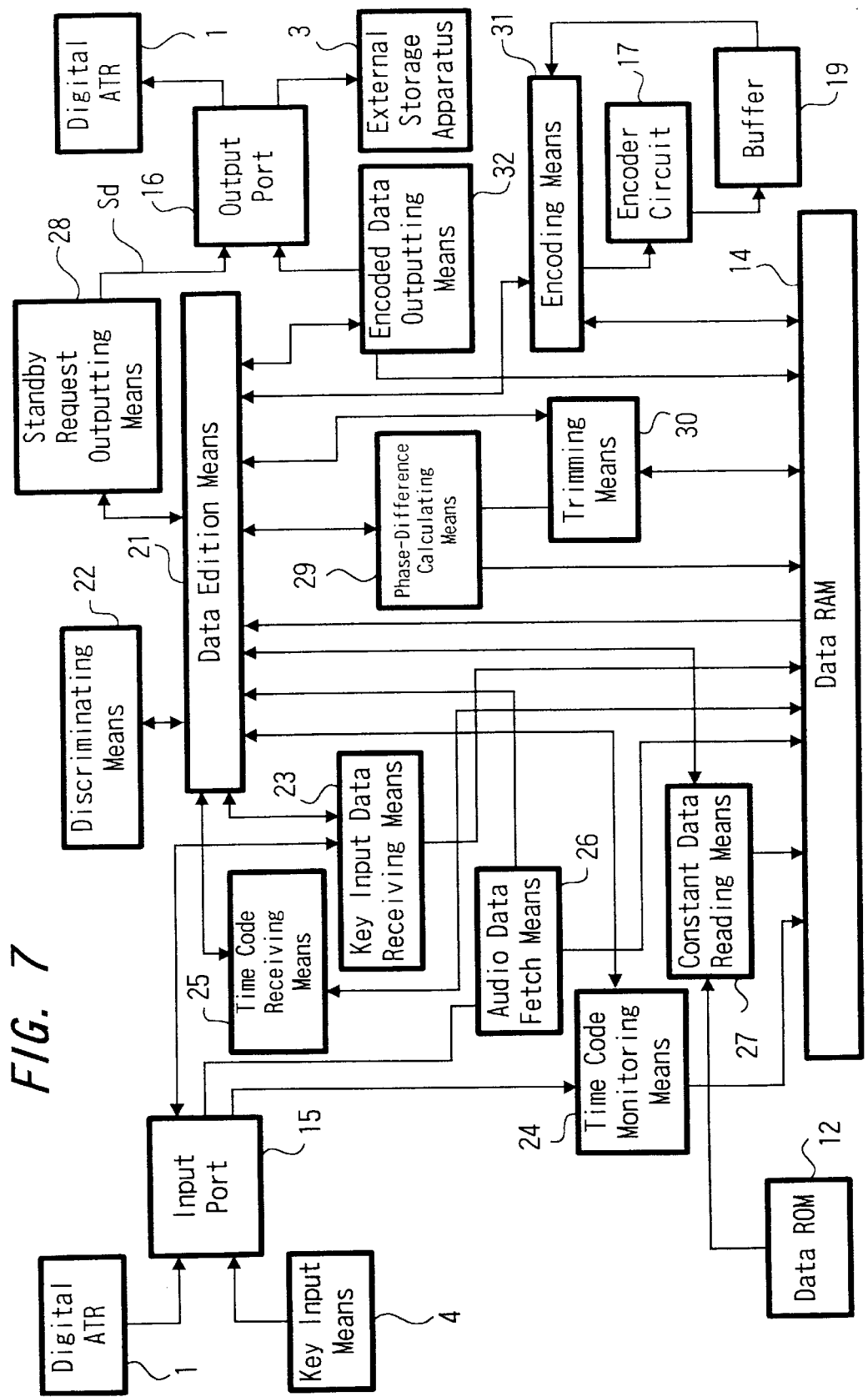
FIG. 7 is a diagram showing functional blocks of a data edition means of the data processing means according to the present invention.
Figure 8:
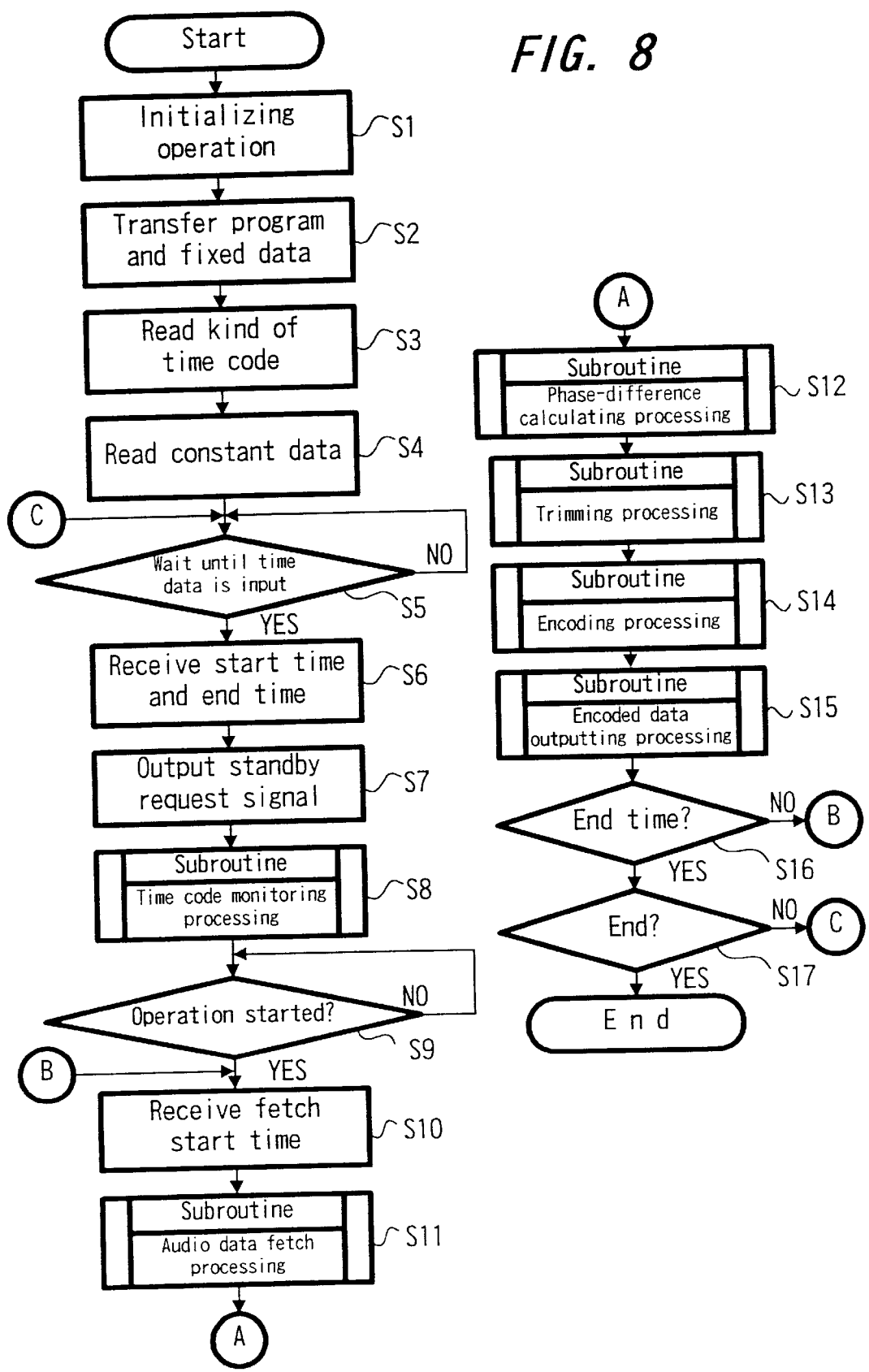
FIG. 8 is a flowchart used to explain an operation of the data edition means.

As shown in FIG. 8 which is a flowchart used to explain a processing operation of a data edition means 21 shown in FIG. 7 and described later on, in step Si, the encoding apparatus 2 according to this embodiment carries out its initial operation, e.g., a system check and a memory check in the encoding apparatus 2, a setup and so on at the same time when the encoding apparatus 2 is energized.

The processing proceeds to step S2. In step S2, a data edition program (processed by the data edition means 21) is read out from the program ROM 11 and stored in the operation RAM 13, thereafter being started. At the same time, a work area used for temporarily storing data generated while the program is working and used for transmitting and receiving parameters between routines forming the above program is allocated in the operation RAM 13.

The following areas are allocated in the data RAM 14: an audio data file for storing the audio data Da from the digital ATR 1 successively; a time information storage area for storing information about a start time and an end time from the key input means 4; a fetch time storage area for storing a time code Ct of a fetch start time from the digital ATR 1; a time code storage area for successively rewriting and storing the time code Ct regularly fetched from the digital ATR 1; a start/end discrimination flag used to discriminate whether the operation is started or ended; an audio sample value storage area for storing a sample value WD of an audio frame Cau corresponding to a time code Ct at the above fetch time; a trimmed data file for successively storing the trimmed audio data Da; an end sample value storage area for storing a sample value WD of an end audio frame Cau; an encoded data file for successively storing an encoded data da output from the encoder circuit 17; a transfer parameter storage area for storing an attribute data used to transfer the encoded data da to the external storage apparatus 3 and the encoded data da of a transfer data length previously determined in accordance with a transfer specification; and a fixed data storage area for storing various fixed data from the data ROM 12.

The fixed data storage area has a time code ID storage area for storing an identification code indicating a kind of the time codes Ct previously set by a specification of the video data, a framing constant storage area for storing a constant data used for converting the time code Ct into the time code frame Ctc previously set in response to the kind of the time code Ct (see the above equations 2 to 5), an audio frame detecting constant storage area of storing a constant data used to detect an audio frame Cau corresponding to the time code frame Ctc (see the above equations 14 to 17), a time code sample constant storage area for storing a constant data used to calculate the audio sample value WD corresponding to the time code frame Ctc (see the above equations 6 to 9), and a frame sample value storage area for storing a fixed data M (which is 1152 in a case of the MPEG/Audio (Layer II)) of the audio sample value corresponding to the audio frame Cau.

As shown in FIG. 7, the data edition means 21 for processing the data edition program stored in the operation RAM 13 has a discriminating means 22 for carrying out various discriminating operations, a key input data receiving means 23 for receiving the key input data input from the key input means 4 through the input port 15 to store the key input data in the predetermined storage area of the data RAM 14, a time code monitoring means 24 for monitoring whether or not time indicated by the time code Ct input from the digital ATR 1 through the input port 15 becomes a start or end time set by an input data from the key input means 4, a time code receiving means 25 for reading out the time code Ct of the start point of reading the audio data Da from the time codes Ct input to the above time code monitoring means 24 to store it in a predetermined storage area of the data RAM 14, and an audio data fetch means 26 for receiving the audio data Da input from the digital ATR 1 through the input port 15 to successively store it in the audio data file of the data RAM 14.

Other than the above various means, the data edition means 21 has a constant data receiving means 27 for reading out a constant data corresponding to the kind of the time code Ct from the data ROM 12 to store it in the predetermined constant storage area of the RAM 14, a standby request outputting means 28 for outputting to the digital ATR 1 a standby request signal Sd indicative of a start of its operation, a phase difference calculating means 29 for calculating the time code frame Ctc and the audio frame Cau corresponding thereto and the audio sample values WD of both the time code frame Ctc and the audio frame Cau based on the time code Ct at the fetch start time and further calculating a phase difference P from the audio sample values WD, a trimming means 30 for trimming the audio data Fa based on the phase difference P calculated by the phase difference calculating means 29, i.e., for removing the audio data FDa having the phase difference P amount and starting from the head of the audio data file to thereafter successively store the rest of the audio data Da in the trimmed data file, an encoding means 31 for successively reading the audio data Da of the audio frame Cau amount from the address (sample) corresponding to the encoding start point to encode them and for successively storing the encoded data da in the encoded data file of the data RAM 14, and an encoded data output processing means 32 for dividing the encoded data da from the encoded data file into data each having a data length T (e.g., 102 bytes) allowing the data to be transferred to the external storage apparatus 3 and for successively transferring the divided data to the external storage apparatus 3.

Returning to the flowchart of FIG. 8, after the processing in step S2 is ended, the processing proceeds to step S3. In step S3, the data edition means 21 initially reads out the identification code indicating the kind of the time code Ct from the time code ID storage area of the data RAM 14. The processing proceeds to step S4.

In step S4, the constant data reading means 27 reads out the constant data corresponding to the kind of the time code Ct from the data ROM 12 for storing various constant data by using the read-out identification code as a read index, for example, and stores the same at a predetermined constant storage area.

Specifically, the constant data reading means 27 stores in the framing constant storage area of the data RAM 14 the constant data corresponding to the kind of the time code Ct to be processed of the constant data used for converting the time code Ct into the time code frame Ctc (see the above equations 2 to 5).

If the kind of the time code Ct indicates the video data of the SMPTE-NDF standard, for example, then the constant data reading means 27 reads out values 108000, 1800, 30, 0 in the equation 2 and stores them in the framing constant storage area. If the kind of the time code Ct indicates the video data of the SMPTE-DF standard, for example, then the constant data reading means 27 reads out values 107892, 1798, 30, 2 in the equation 3 and stores them in the framing constant storage area.

The last value 0 or 2 of the above values is the constant data used for obtaining a value of k in the equation 3 and particularly a value of C. Since the value of k must be added in the equation 3 for converting the time code Ct of the video data of the SMPTE-DF standard into the time code frame Ctc, it is possible to obtain the value of k by setting C=2. On the other hand, since the value of k is not necessary in the equation 2 for converting the time code Ct of the video data of the SMPTE-NDF standard into the time code frame Ctc, if the value of C is set to C=0 for convenience in calculation, then the value of k becomes k=0, which allows the calculation to be carried out on the assumption that k does not exist equivalently.

The constant data reading means 27 stores in the audio frame detecting constant storage area of the data RAM 14 the constant data used to detect the audio frame Cau corresponding to the time code frame Ctc (see the above equations 14 to 17).

If the frame frequency of the time code Ct is the video data of NTSC (BIW) system, i.e., 30 Hz, then the constant data reading means 27 reads out values 245, 192 and stores them in the audio frame detecting constant storage area. If the frame frequency of the time code Ct is the video data of NTSC (color) system, i.e., about 29.97 Hz, then the constant data reading means 27 reads out values 49049, 38400 and stores them in the audio frame detecting constant storage area.

The constant data reading means 27 stores in the time code sample constant storage area the constant data used for obtaining the audio sample value WD (see the above equations 6 to 9) corresponding to the time code frame Ctc.

If the frame frequency of the time code Ct is that of NTSC (B/W) system, i.e., 30 Hz, then the constant data reading means 27 reads out value 1470 and stores it in the time code sample constant storage area. If the frame frequency of the time code Ct is that of NTSC (color) system, i.e., about 29.97 Hz, then the constant data reading means 27 reads out value 1471.47 and stores it in the time code sample constant storage area.

Subsequently, the constant data reading means 27 stores in the frame sample value storage area the fixed data M (1152 in this case) of the audio sample value corresponding to the audio frame Cau.

Returning to the flowchart of FIG. 8, the processing proceeds to step S5. In step S5, the discriminating means 22 discriminates whether or not the time data (start and end time data) is input from the key input means 4 through the input port 15. This discrimination is repeatedly carried out until the above time data is practically input. Specifically, the processing does not proceed until the time data is input.

If it is determined in step S5 that the time data is input, then the processing proceeds to step S6, wherein the data edition means 21 stores the time data (the start time data and the end time data) in the time information storage area of the data RAM 14 through the key input data receiving means 23.

The processing proceeds to step S7. In step S7, the standby request outputting means 28 outputs the standby request signal Sd through the output port 16 to the digital ATR 1. The digital ATR 1 reproduces a magnetic tape based on the standby request signal Sd input from the encoding apparatus 2.

After the standby request outputting means 28 outputs the standby request signal Sd, the processing proceeds to step S8, wherein an operation of the time code monitoring means 24 is started (i.e., a time code monitoring program is started). The time code monitoring means 24 and the data edition means 21 are operated in a time sharing system. Specifically, in step S8, the processing of the data edition means 21 proceeds to a time code monitoring subroutine. The processings of the main routine and the time code monitoring subroutine are carried out simultaneously in a time sharing system until the processing of the time code monitoring subroutine is ended.

Figure 9:
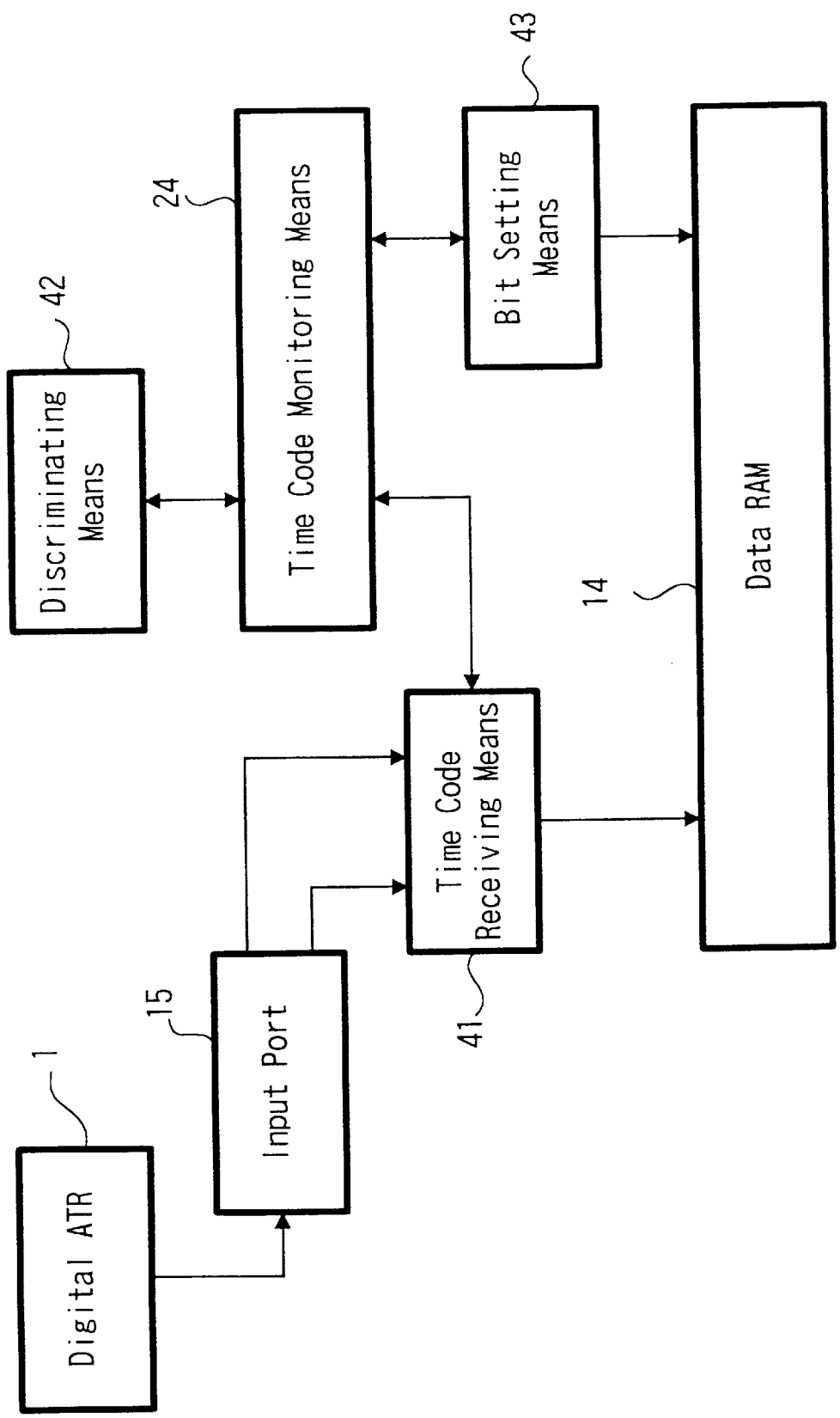
FIG. 9 is a diagram showing functional blocks of a time code monitoring means of the data edition means.

An arrangement of the time code monitoring means 24 and an operation thereof will be described respectively with reference to FIGS. 9 and 10 which are a diagram showing functional blocks thereof and a flowchart used to explain the operation thereof. As shown in FIG. 9, the time code monitoring means 24 has a time code receiving means 41 for discriminating whether or not an input interruption of the time code Ct from the digital ATR 1 occurs and for receiving, if the above input interruption occurs, the time code Ct input to the encoding apparatus 2 to overwrite and store the input time code Ct in the predetermined area of the data RAM 14, a discriminating means 42 for discriminating whether time indicated by the input time code Ct is the start time or the end time, and a bit setting means 43 for setting a bit indicative of "start" of the start/end discriminating flag to "1" if the discriminated result of the discriminating means 42 indicates the start time and for setting a bit indicative of "end" of the start/end discriminating flag to "1" if the discriminated result of the discriminating means 42 indicates the end time.

Figure 10:
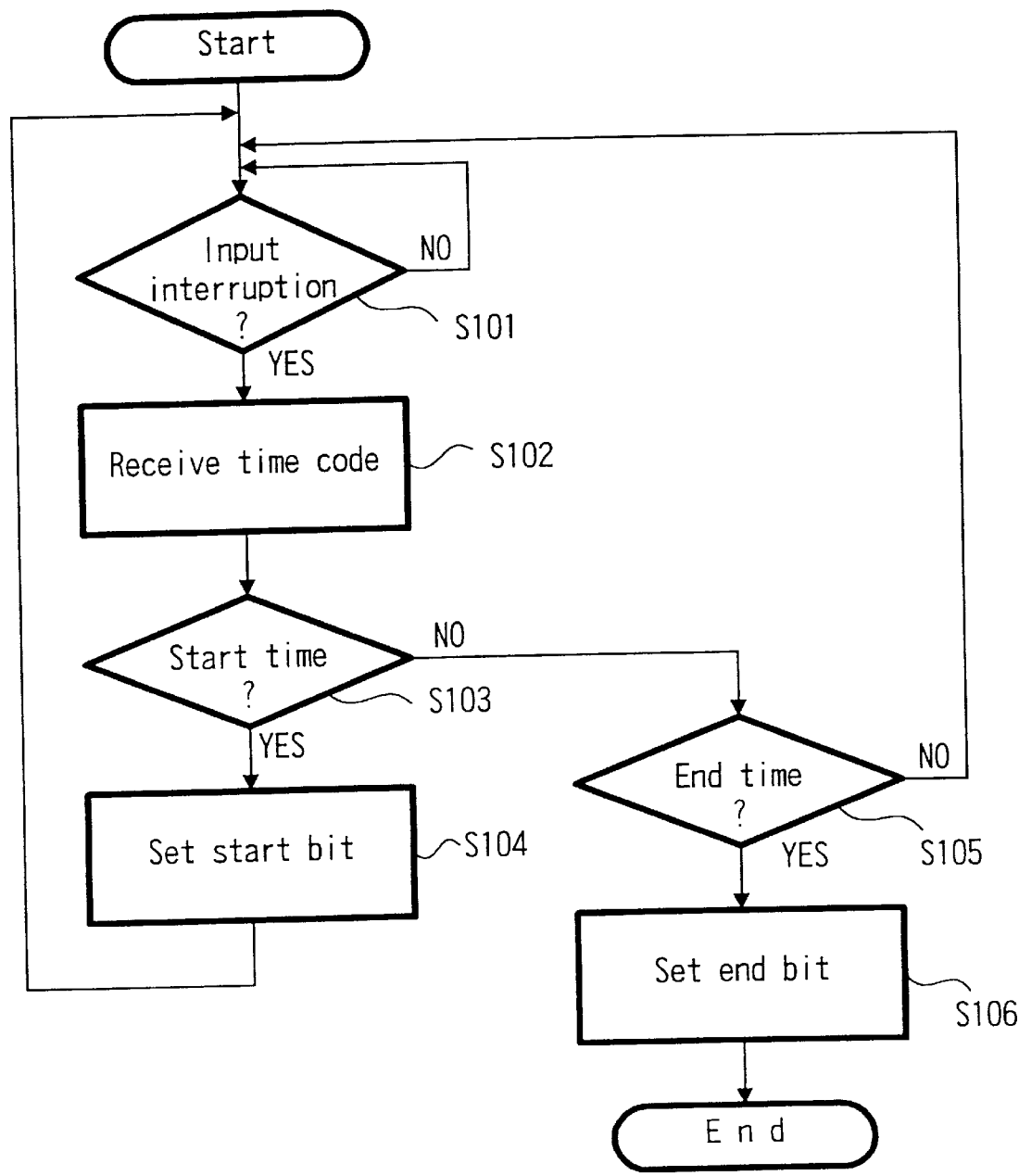
FIG. 10 is a flowchart used to explain an operation of the time code monitoring means.

As shown in FIG. 10, in step 101, the time code receiving means 41 of the time code monitoring means 24 discriminates whether or not the input interruption of the time code Ct from the digital ATR 1 occurs. This discrimination is repeatedly carried out until the input interruption occurs. Specifically, the processing or the time code monitoring means 24 does not proceed until the input interruption of the time code Ct occurs.

If it is determined in step S101 that the input interruption of the time code Ct occurs, then the processing proceeds to step S102, wherein the time code receiving means 41 successively overwrites and stores the time code Ct input from the digital ATR 1 through the input port 15 in the time code storage area of the data RAM 14.

Then, the processing proceeds to step S103, wherein the discriminating means 42 discriminates whether or not the time indicated by the time code Ct stored in the above time code storage area is equal to the start time stored in the time information storage area.

If it is determined in step S103 that the time is equal to the start time, then the processing proceeds to step S104, wherein the bit setting means 43 sets the bit (e.g., the first bit) indicative of the "start" of the start/end discriminating flag. After the processing in step S104 is ended, the processing returns to S101, wherein the time code monitoring means 24 waits for the input interruption of the next time code Ct.

If on the other hand it is determined in step S103 that the time is not equal to the start time, then the processing proceeds to step S105, wherein the discriminating means 42 discriminates whether or not the time indicated by the time code Ct is equal to the end time. If it is determined in step S105 that the time is not equal to the end time, then the processing returns to step S101, wherein the time code monitoring means 24 waits for the input interruption of the next time code Ct. If on the other hand it is determined in step S106 that the time is equal to the end time, then the processing returns to step S106, wherein the bit setting means 43 sets the bit (e.g., the second bit) indicative of the "end" of the start/end discriminating flag. When the processing in step S106 is ended, the operation of the time code monitoring means 24 is ended.

Returning to the main routine of the processing of the data edition means 21 shown in the flowchart of FIG. 8, the processing of the data edition means 21 proceeds to step S9. In step S9, the discriminating means 22 discriminates whether or not the processing of the encoding apparatus 2 is started. This discrimination is carried out by discriminating whether or not the bit indicative of the "start" of the start/end discrimination flag is "1" and repeatedly carried out until the bit indicative the "start" becomes "1".

Specifically, in step S9, when the time indicated by the time code Ct input to the encoding apparatus 2 becomes equal to the start time, the data edition means 21 is brought in its standby state until the time code monitoring means 24 set the bit indicative of the "start" to "1".

When the bit indicative of the "start" is set to "1", the processing proceeds to step S10. In step S10, the time code receiving means 25 stores the time code Ct corresponding to the fetch start time of the audio data Da in the fetch time storage area of the data RAM 14. Specifically, the time code receiving means 25 stores in another area (the fetch time storage area) the time code Ct stored in the time code storage area by the time code monitoring means 24, Then, the processing proceeds to step S11, wherein the processing proceeds to au audio data fetching subroutine.

Figure 11:
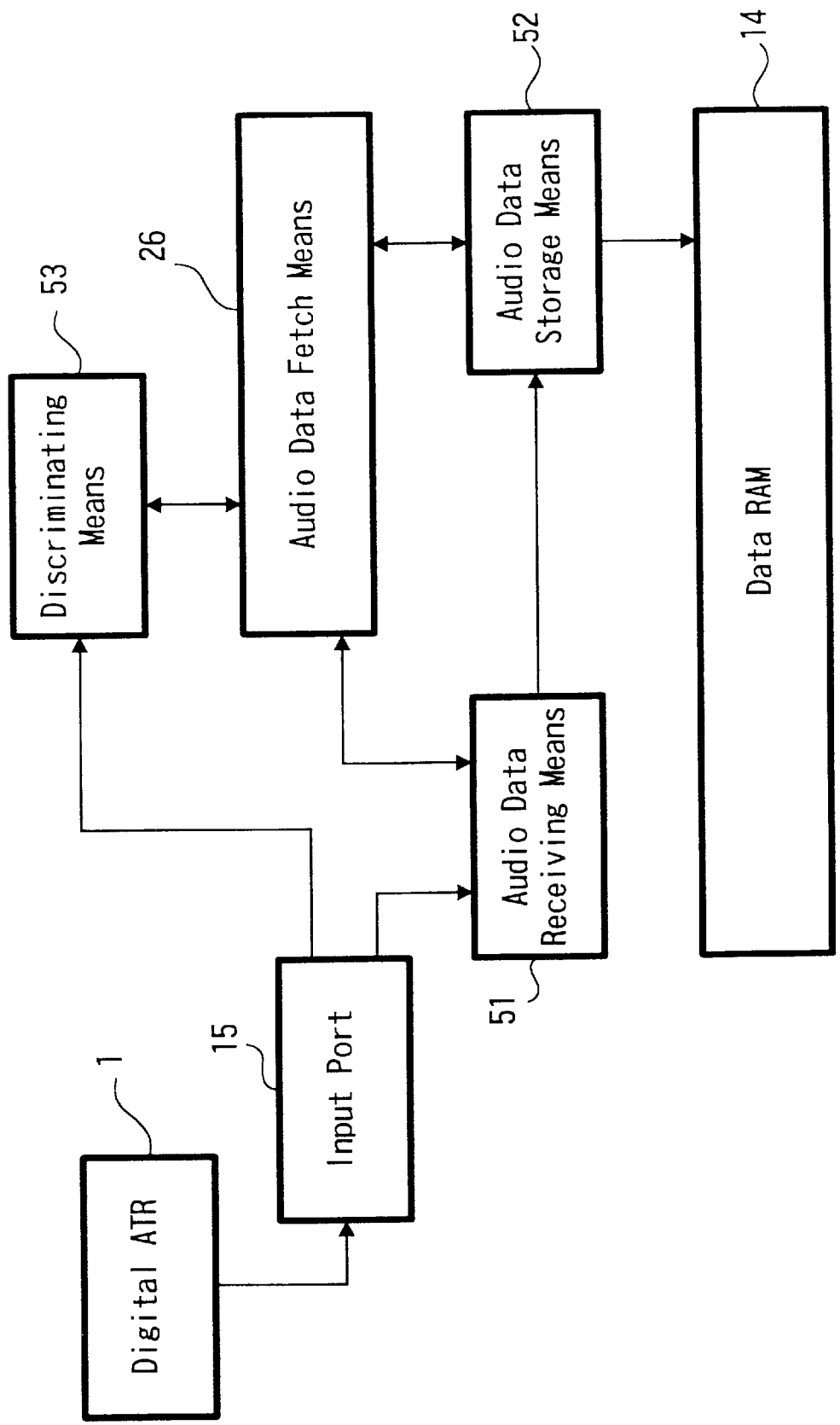
FIG. 11 is a diagram showing functional blocks of an audio data fetch means of the data edition means.

As shown in FIG. 11 which is a diagram showing an functional blocks of the audio data fetch means 26, the audio data fetch means 26 has an audio data receiving means 51 for receiving the audio data Da input thereto from the digital ATR 1 through the input port 15, an audio data storage means 52 for storing the audio data Da received by the audio data receiving means 51 in the predetermined area of the data RAM 14 by a sample unit, and a discriminating means 53 for discriminating whether or not an interruption signal Se indicative of an end of an operation of reproducing data from the magnetic tape is input from the digital ATR 1.

Figure 12:
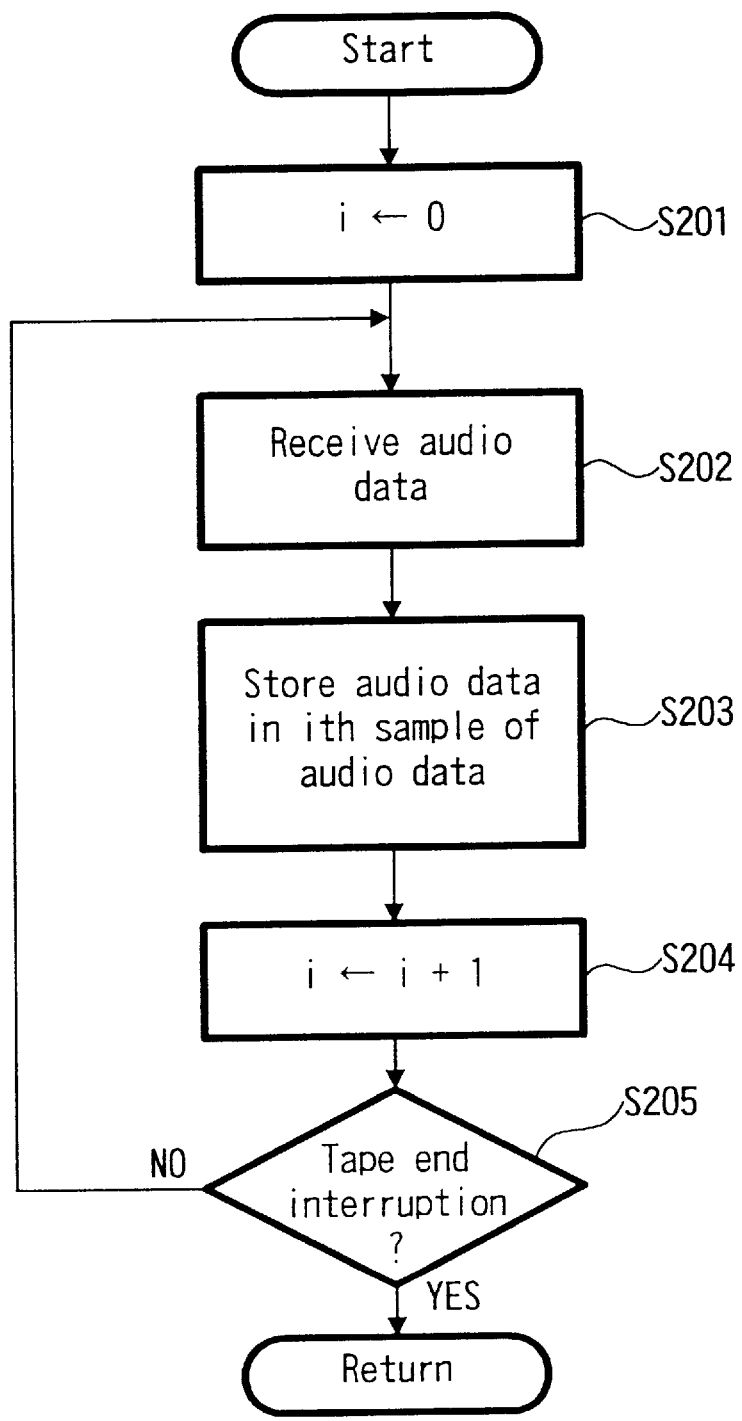
FIG. 12 is a diagram showing functional blocks of the audio data fetch means of the data edition means.

As shown in FIG. 12 which is a flowchart used to explain an operation of the audio data fetch means 26 (i.e., the processing in the audio data fetching subroutine), in step S201 an initial value "0" is stored in a register declared as an index register i (hereinafter referred to simply as an index register i) of various registers used in the processing of the data edition means 21, thereby the index register i being initialized.

Then, the processing proceeds to step S202, wherein the audio data receiving means 51 receives the audio data Da input thereto from the digital ATR 1 through the input port 15.

Then, the processing proceeds to step S203, wherein the audio data storage means 52 stores the audio data Da received by the audio data receiving means 51 in the audio data file whose sample number is indicated by the index register i (hereinafter referred to simply as an ith sample).

Then, the processing proceeds to step S204, wherein a value of the index register i is updated by +1.

Then, the processing proceeds to step S205. In step S205, the discriminating means 53 discriminates whether or not the interruption signal Se indicative of the end of the operation of reproducing data from the magnetic tape is input from the digital ATR 1. If it is determined in step S205 that the interruption signal Se is not input, then the processing returns to step S202 and the processings in step S202 and the succeeding steps are repeated. Specifically, the processing of receiving the next audio data Da to store it in the ith sample of the audio data file is repeated.

When the above interruption signal Se is input, the processing of the audio data fetching subroutine carried out by the audio data fetch means 26 is ended.

The processing returns to the main routine shown in FIG. 8 and proceeds to step S12, wherein the processing proceeds to a phase-difference calculating subroutine to be carried out by the phase-difference calculating means 29.

Figure 13:
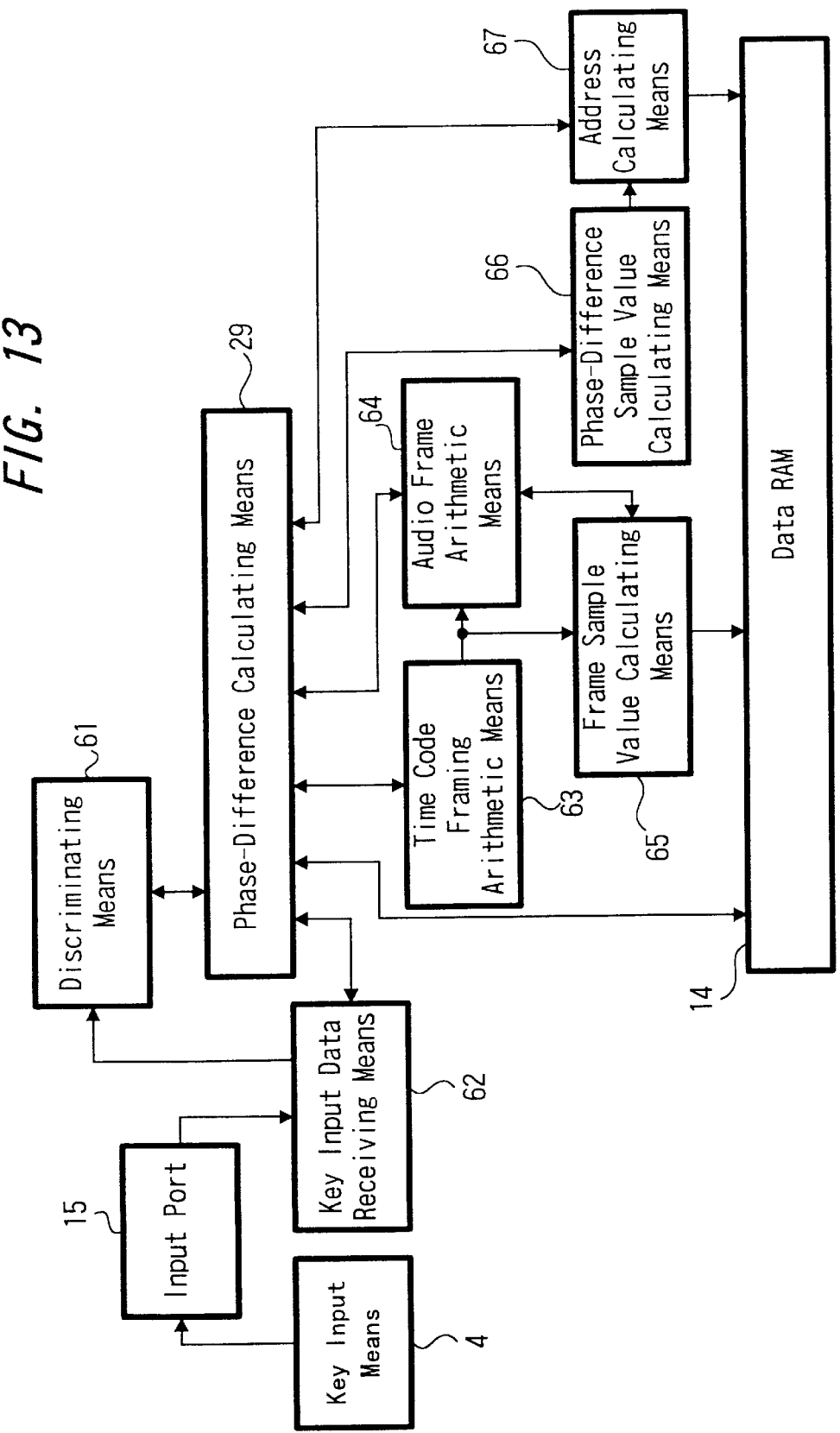
FIG. 13 is a diagram showing functional blocks of a phase-difference calculating means of the data edition means.

As shown in FIG. 13 which is a diagram showing functional blocks of the phase-difference calculating means 29, the phase-difference calculating means 29 has a discriminating means 61 for carrying our various discrimination operations, a key input data receiving means 62 for receiving the key input data input thereto from the key input means 4 through the input port 15 to supply it to the discriminating means 61, a time code framing arithmetic means 63 for converting the time code Ct into the time code frame Ctc based on the time code stored in the fetch time storage area and the constant data stored in the framing constant storage area, an audio frame arithmetic means 64 for calculating the audio frame Cau corresponding to the time code frame Ctc obtained by the time code framing arithmetic means 63 based on the time code frame Ctc and the constant data stored in the audio frame detecting constant storage area, a frame sample value calculating means 65 for calculating the audio sample value WD corresponding to the obtained time code frame Ctc based on the obtained time code frame Ctc and the constant data stored in the time code sample constant storage area to further calculate the audio sample value WD corresponding to the obtained audio frame Cau based on the audio frame Cau and the constant data stored in the frame sample value constant storage area, a phase-difference calculating means 66 for calculating the phase difference P (sample value) based on the sample values WD of the time code frame Ctc and the audio frame Cau, and an address calculating means 67 for calculating a reading head address (sample value) of the audio data file based on the obtained phase difference P.

Figure 14:
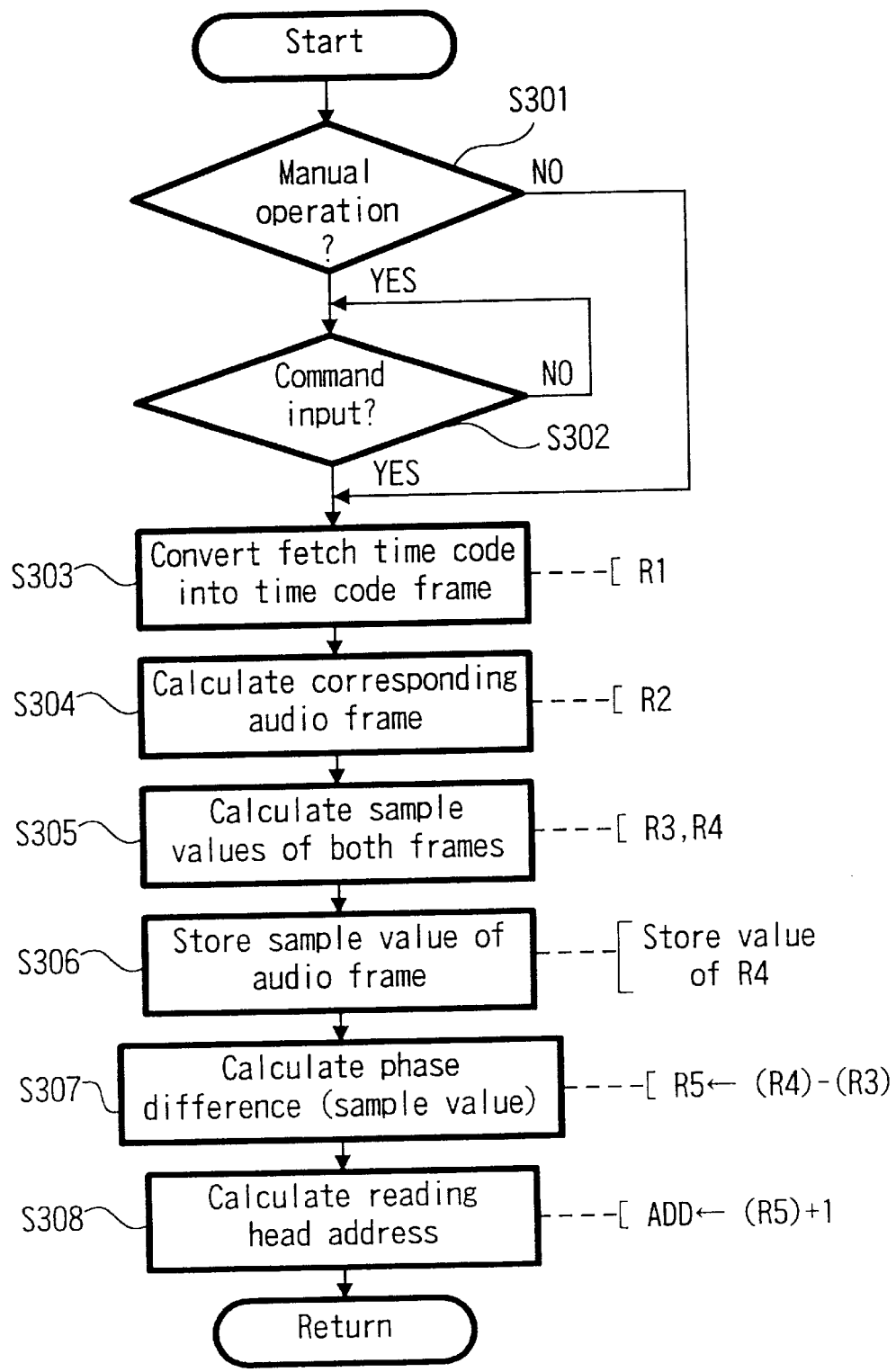
FIG. 14 is a diagram showing functional blocks of the phase-difference calculating means of the data edition means.

As shown in FIG. 14 which is a flowchart used to explain an operation of the phase-difference calculating means 29 (i.e., the processing of the phase-difference calculating subroutine), in step S301, the discriminating means 61 discriminates whether the operation of the phase-difference calculating means 29 is started manually or automatically. This discrimination is carried out by discriminating contents of the key input data input from a automatic/manual changeover switch of the key input means 4, for example.

If it is determined in step S301 that the operation is started manually, then the processing proceeds to step S302, wherein the discriminating means 61 discriminates whether or not the operation is to be started. This discrimination is carried out by discriminating whether or not a command data indicative of "start of operation" is input from the key input means 4. The processing in step S302 is repeatedly carried out until the input of the command data. Specifically, the processing of the phase-difference calculating means 29 does not proceed until the command data is input.

If it is determined in step S302 that the command data is input, then the processing proceeds to step S303. If it is determined in step S301 that the operation is started automatically on the contrary, then the processing proceeds directly from step S301 to step S303.

In step S303, the time code framing arithmetic means 63 frames the time code Ct stored in the fetch time storage area to obtain the time code frame Ctc. This calculation is carried out by substituting the time code Ct stored in the fetch time storage area and the constant data stored in the framing constant storage area in the algorithms of the above equations 2 to 5.

If the kind of the time indicates the video data of the SMPTE-DF standard, for example, since the values 107892, 1798, 30, 2 are stored as the constant data in the framing constant storage area, the time code framing arithmetic means 64 reads these constant data to calculate, based thereon, the time code frame Ctc corresponding to the fetch time (time code) at this time in accordance with the above equation 3. The time code frame Ctc thus obtained is stored in a first register R1 (a register declared as a first work register R1 of the various registers used by the data edition means 21).

Then, the processing proceeds to step S304, wherein the audio frame arithmetic means 64 calculates the audio frame Cau corresponding to the time code frame Ctc obtained in step S303. This calculation is carried out by substituting the time code frame Ctc stored in the first register R1 and the constant data stored in the audio frame detecting constant storage area in the algorithms of the above equations 14 to 17.

If the frame frequency of the time code Ct is that of the NTSC (color) system, i.e., about 29.97 Hz, then the values 49049, 38400 are stored as the constant data in the audio frame detecting constant storage area. Therefore, the audio frame arithmetic means 64 reads out these constant data to calculate the audio frame Cau corresponding to the time code frame Ctc at this time in accordance with the above equation 15. The audio frame Cau thus obtained is stored in a second register R2 (a register declared as a second work register R2 of the various registers used by the data edition means 21).

Then, the processing proceeds to step S305, wherein the frame sample value calculating means 65 calculates the audio sample value WD corresponding to the above time code frame Ctc and the above audio frame Cau. This calculation is carried out by substituting the time code frame Ctc stored in the first register R1 and the constant data stored in the time code sample constant storage area in the algorithms of the above equations 6 to 9.

If the frame frequency of the time code Ct is that of the NTSC (color) system, i.e., about 29.97 Hz, for example, then the value 1471.47 is stored as the constant data in the time code sample constant storage area. Therefore, the frame sample value calculating means 65 reads out these constant data to calculate the audio sample value WD corresponding to the time code frame Ctc at this time in accordance with the above equation 7. The audio sample value WD thus obtained is stored in a third register R3 (a register declared as a third work register R3 of the various registers used by the data edition means 21).

The frame sample value calculating means 65 carries out calculation by substituting the audio frame Cau stored in the second register R2 and the fixed data M (=1152) stored in the frame sample value storage area in the algorithm of the above equation 1. The audio sample value WD thus obtained is stored in a fourth register R4 (a register declared as a fourth work register R4 of the various registers used by the data edition means 21).

Then, the processing proceeds to step S306, wherein the frame sample value calculating means 65 stores the audio sample value WD corresponding to the audio frame Cau and stored in the fourth register R4 in the audio sample value storage area of the data RAM 14.

Then, the processing proceeds to step S307, wherein the phase-difference sample value calculating means 66 calculate the phase difference P (sample value) at this time. This calculation is carried out by subtracting the audio sample value WD of the time code frame Ctc stored in the third register R3 from the audio sample value WD of the audio frame Cau stored in the fourth register R4. The phase difference P (sample value) thus obtained is stored in a fifth register R5 (a register declared as a fifth work register R5 of the various registers used by the data edition means 21).

Then, the processing proceeds to step S308, wherein the address calculating means 67 calculates the reading head address (sample value) of the audio data file based on the phase difference P obtained by the phase-difference sample value calculating means 66. This calculation is carried out by adding the phase difference (sample value) stored in the fifth register R5 with one sample. This reading head address is stored in a register ADD.

When the processing in step S308 is ended, the processing of the phase-difference calculating means 29 (i.e., the processing of the phase-difference calculating subroutine) is ended.

Returning ba ck to the main routine shown in FIG. 8, the processing proceeds to step S13, wherein the processing proceeds to a trimming subroutine (a processing of the trimming means 30).

Figure 15:
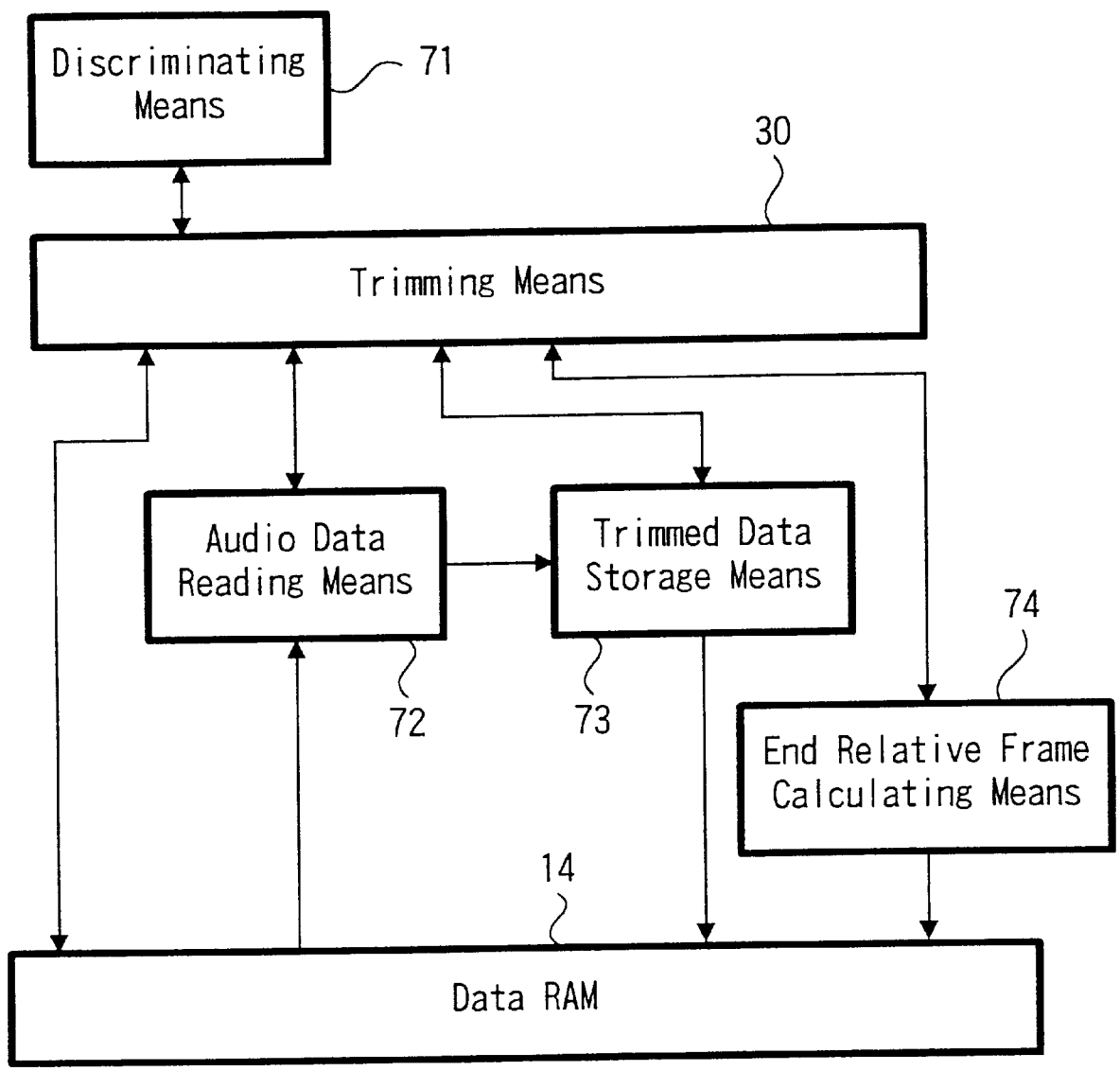
FIG. 15 is a diagram showing functional blocks of a trimming means of the data edition means.

As shown in FIG. 15 which is a diagram showing functional blocks of the trimming means 30, the trimming means 30 has a discriminating means 71 for carrying out various discriminating operations, an audio data reading means 72 for successively reading at a sample unit the audio data Da stored in the audio file from the reading head address (sample) stored in the register ADD, a trimmed data storage means 73 for successively storing the audio data Da read through the audio data reading means 72 by a sample unit, and an end relative frame calculating means 74 for calculating the relative audio frame Cau corresponding to the encoding end point by subtracting the number of frames of the margin amounts (two-frame amount in this example) from a relative audio frame Cau corresponding to the last audio data Da.

A relative audio frame Cau is an audio frame Cau with respect to data reproduced from one magnetic tape, being used to distinguish it from an absolute audio frame Cau with respect to data continuously reproduced from a plurality of magnetic tapes. An absolute audio sample value WD is an accumulated sample value with respect to data continuously reproduced from a plurality of magnetic tapes.

Figure 16:
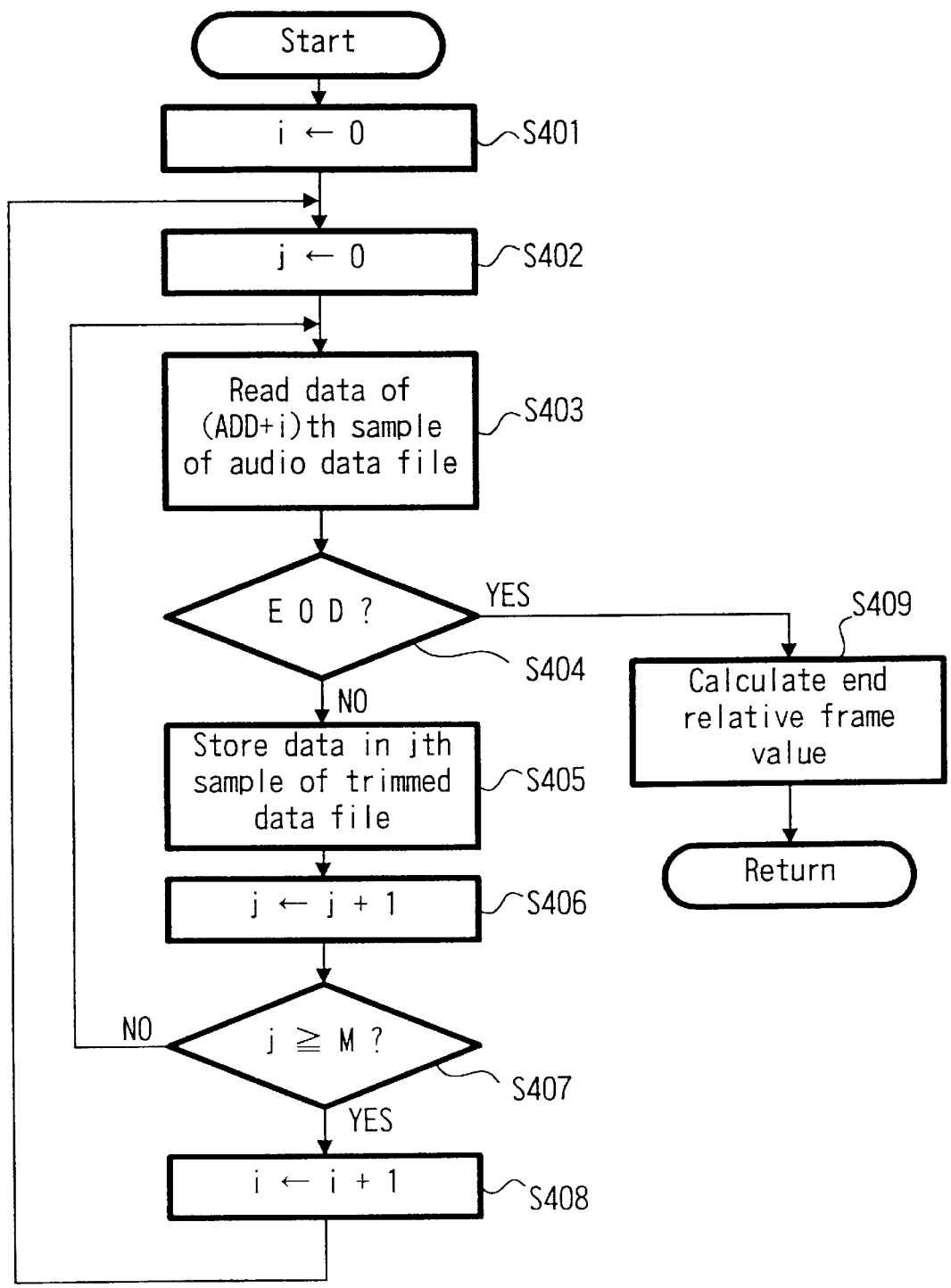
FIG. 16 is a diagram showing functional blocks of the trimming means of the data edition means.

As shown in FIG. 16 which is a flowchart used to explain an operation of the trimming means 30 (a processing of a trimming subroutine), in step S401, an initial value "0" is stored in the index register i, thereby the index register i being initialized.

Then, the processing proceeds to step S402, wherein an initial value "0" is stored in a register declared as an index register j (hereinafter simply referred to as an index register j) of the various registers used by the data edition means 21, thereby the index register j being initialized.

Then, the processing proceeds to step S403, wherein the audio data reading means 72 reads out the audio data Da of one sample amount from the audio data file starting from an address (i.e., the (ADD+j)th sample) indicated by a sample value obtained by adding a value of the index register j to the reading head address stored in the register ADD.

The processing proceeds to step S404, wherein the discriminating means 71 discriminates whether or not the reading operation is finished. This discrimination is carried out by discriminating whether or ont the audio data Da read out has an EOD code.

If it is discriminated in step S404 that the audio data Da read out does not have the EOD code, then the processing proceeds to step S405, wherein the trimmed data storage means 73 stores the audio data Da read out in the jth sample of the trimmed data file.

The processing proceeds to step S406, wherein a value of the index register j is updated by +1. Then, the processing proceeds to step S407, wherein it is discriminated that an operation of storing the audio data Da of one audio frame amount is finished. This discrimination is carried out by discriminating whether or not the value of the index register j reaches the value of the fixed data M (=1152 sample) stored in the frame sample value storage area or greater.

If it is determined in step S407 that the value of the index register j is smaller than the fixed data M, then the processing returns to step S403, thereafter the processings in step S403 and the succeeding steps are repeatedly carried out. Specifically, the operation of reading the audio data Da from the (ADD+j)th sample of the audio data file to store it in the jth sample of the trimmed data file is repeatedly carried out.

When it is determined in step S407 that the value of the index register j becomes equal to or greater than the fixed data M, the processing proceeds to step S408, wherein the value of the index register i is updated by +1.

Then, the processing returns to step S402, thereafter the processings in step S402 and the succeeding steps being repeatedly carried out.

The processings in steps S402 to S408 are carried out until it is determined in step S404 that the audio data Da read out has the EOD code.

If it is determined in step S404 that the audio data Da read out had the EOD data, i.e., if the operation of reading all the audio data Da to be read at this time is finished, then the processing proceeds to step S409, wherein the end relative frame calculating means 74 calculates the relative audio frame Cau corresponding to the encoding end point by subtracting the relative audio frame Cau corresponding to the last audio data Da by the number of frames (two frames in this example) of the margin amount. Specifically, the end relative frame calculating means 74 carries out this calculation by subtracting 2 from the value of the index register i. The end relative audio frame value thus obtained is stored in an end frame storage register N.

When the processing in step S409 is finished, the processing of the trimming subroutine (the operation of the trimming means 30) is ended.

Then, the processing returns to the main routine shown in FIG. 8 and proceeds to step S14, wherein the processing proceeds to a processing of an encoding subroutine (i.e., an operation of the encoding means 31).

Figure 17:
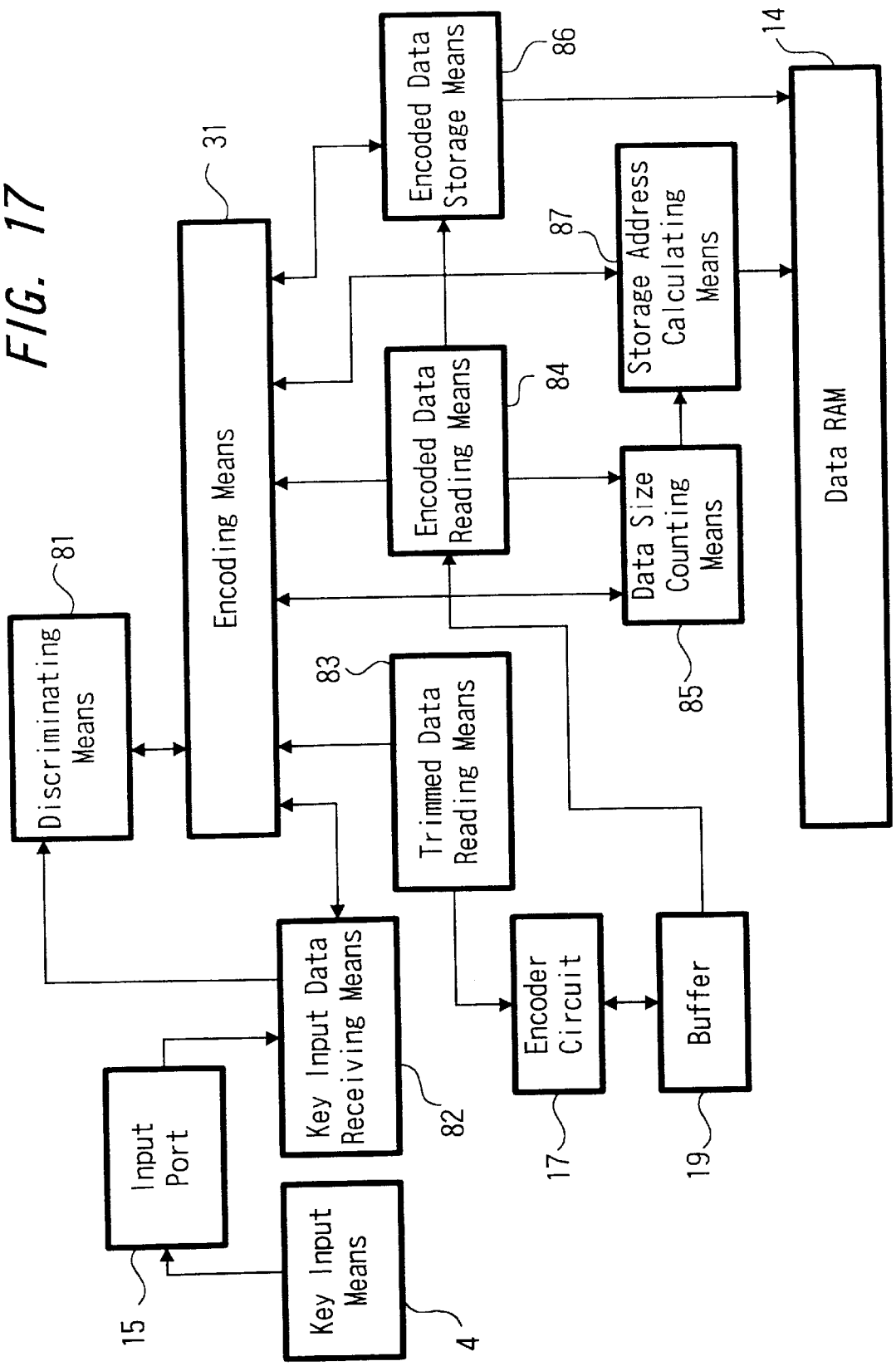
FIG. 17 is a diagram showing functional blocks of an encoding means of the data edition means.

As shown in FIG. 17 which is a diagram showing functional blocks of the encoding means 31, the encoding means 31 has a discriminating means 81 for carrying out various discrimination operations, a key input data receiving means 82 for receiving the key input data input from the key input means 4 through the input port 15 to supply it to the discriminating means 81, a trimmed data reading means 83 for successively reading out the audio data Da from the trimmed data file by an audio frame unit to output it to the encoder circuit 17, an encoded data reading means 84 for reading out the encoded data da encoded by the encoder circuit 17 therefrom through the buffer 19, a data size counting means 85 for counting a data size of the encoded data da read by the encoded data reading means 84 by a byte unit, an encoded data storage means 86 for storing the encoded data da read by the encoded data reading means 84 in the encoded data file of the data RAM 14, and a storage address calculating means 87 for calculating a storage address used for storing the encoded data da in the encoded data file.

Figure 18:
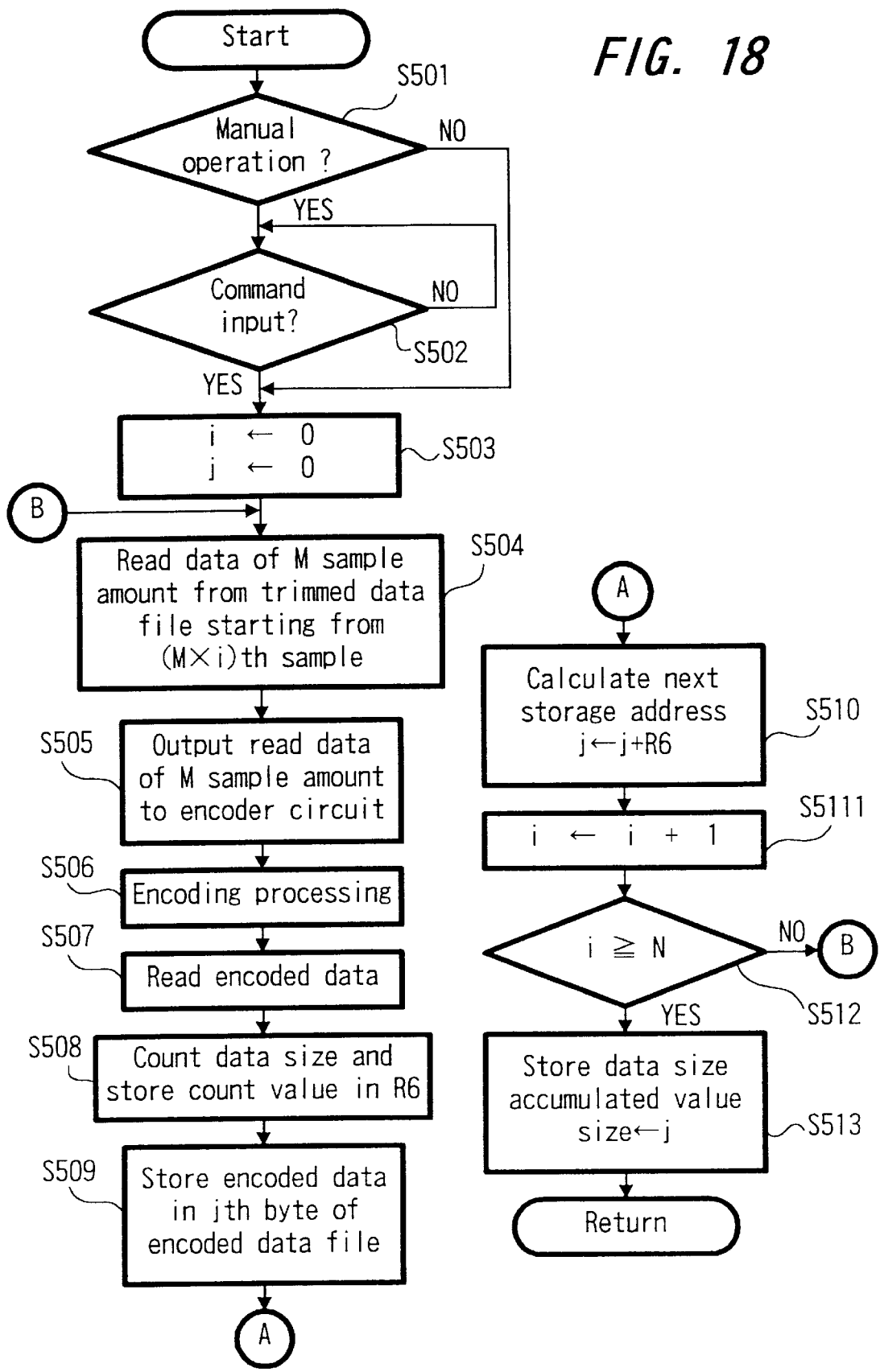
FIG. 18 is a diagram showing functional blocks of the encoding means of the data edition means.

As shown in FIG. 18 which is a flowchart used to explain an operation of the encoding means 31 (a processing of an encoding subroutine), in step S501, the discriminating means 81 discriminates whether the operation of the encoding means 31 is started manually or automatically. This discrimination is carried out by discriminating contents of the key input data input from a automatic/manual changeover switch of the key input means 4, for example.

If it is determined in step S501 that the operation is started manually, then the processing proceeds to step S502, wherein the discriminating means 81 discriminates whether or not the operation is to be started. This discrimination is carried out by discriminating whether or not a command data indicative of "start of operation" is input from the key input means 4. The processing in step S502 is repeatedly carried out until the input of the command data. Specifically, the processing of the encoding means 31 does not proceed until the command data is input.

If it is determined in step S502 that the command data is input, then the processing proceeds to step S503. If it is determined in step S501 on the contrary that the operation is started automatically, then the processing proceeds directly from step S301 to step S503.

In step S503, the initial value "0" is stored in the index registers i and j, thereby the index registers i and j being initialized.

Then, the processing proceeds to step S504, wherein the trimmed data reading means 83 reads out from the trimmed data file the audio data Da of an amount of M samples starting from an address (i.e., (M×i)th sample) indicated by a value obtained multiplying the value of the index register i and the fixed data M (=1152 samples).

The processing proceeds to step S505, wherein the trimmed data reading means 83 outputs the read-out audio data Da of the amount of M samples to the encoder circuit 17.

Then, the processing proceeds to step S506, wherein the encoder circuit 17 encodes the audio data Da of the amount of M samples (i.e., one audio-frame amount) supplied from the trimmed data reading means 83 in accordance with the algorithm of the MPEG/Audio (Layer II) standard by using the buffer 19, and stores the encoded data da encoded thereby in the buffer 19.

Then, the processing proceeds to step S507, wherein the encoded data reading means 84 reads out the encoded data da from the buffer 19. Then, the processing proceeds to step S508, wherein the data size counting means 85 counts the data size of the encoded data da by a byte unit when the encoded data da is read out from the buffer 19. This counted value is stored in a sixth register R6 (a register declared as a sixth work register R6 of the various registers used by the data edition means 21).

Then, the processing proceeds to step S509, wherein the encoded data storage means 86 stores the encoded data da read out by the encoded data reading means 84 in the encoded data file. At this time, the encoded data da are successively stored in the encoded data file with the jth byte of the encoded data file being set as a start address.

The processing proceeds to step S510, wherein the storage address calculating means 87 calculates a start address of the encoded data file in which the encoded data da must be stored at the next time. This calculation is carried out by adding the value of the index register j and the count value of the size of the encoded data at this time stored in the sixth register R6 to store the added value in the index register j.

The processing proceeds to step S511, wherein the value of the index register i is updated by +1. The processing proceeds to step S512, wherein it is discriminated whether or not a processing of encoding the audio data Da stored in the trimmed data file is finished. This discrimination is carried out by discriminating whether or not the value of the index register i becomes equal to or larger than the end relative audio frame value stored in the register N.

If it is determined in step S512 that the value of the index register i is smaller than the end relative audio frame, then the processing returns to step S504 and thereafter the processings in step S504 and the succeeding steps are repeatedly carried out. Specifically, after the audio data Da of a next one audio frame amount is read our from the trimmed data file and output to the encoder circuit 17, the encoder circuit 17 encodes the audio data Da of the next one audio frame and then the encoded data da is stored in the encoded data file from the jth byte.

If it is determined in step S512 that the value of the index register i is equal to or larger than the end relative audio frame, i.e., if it is determined that the operation of encoding the audio data Da stored in the trimmed data file is finished, then the processing proceeds to step S513, wherein the accumulated value of the data sizes of the encoded data da stored in the index register j is stored in a register SIZE (a register declared as a data size storage register SIZE of the various registers used by the data edition means 21).

When the processing in step S513 is finished, the processing of the encoding subroutine (the operation of the encoding means 31) is finished.

Returning to the main routine shown in FIG. 8, the processing of the main routine proceeds to step S15, wherein the processing proceeds to a processing of an encoded data output subroutine (i.e., an operation of the encoded data outputting means 32).

Figure 19:
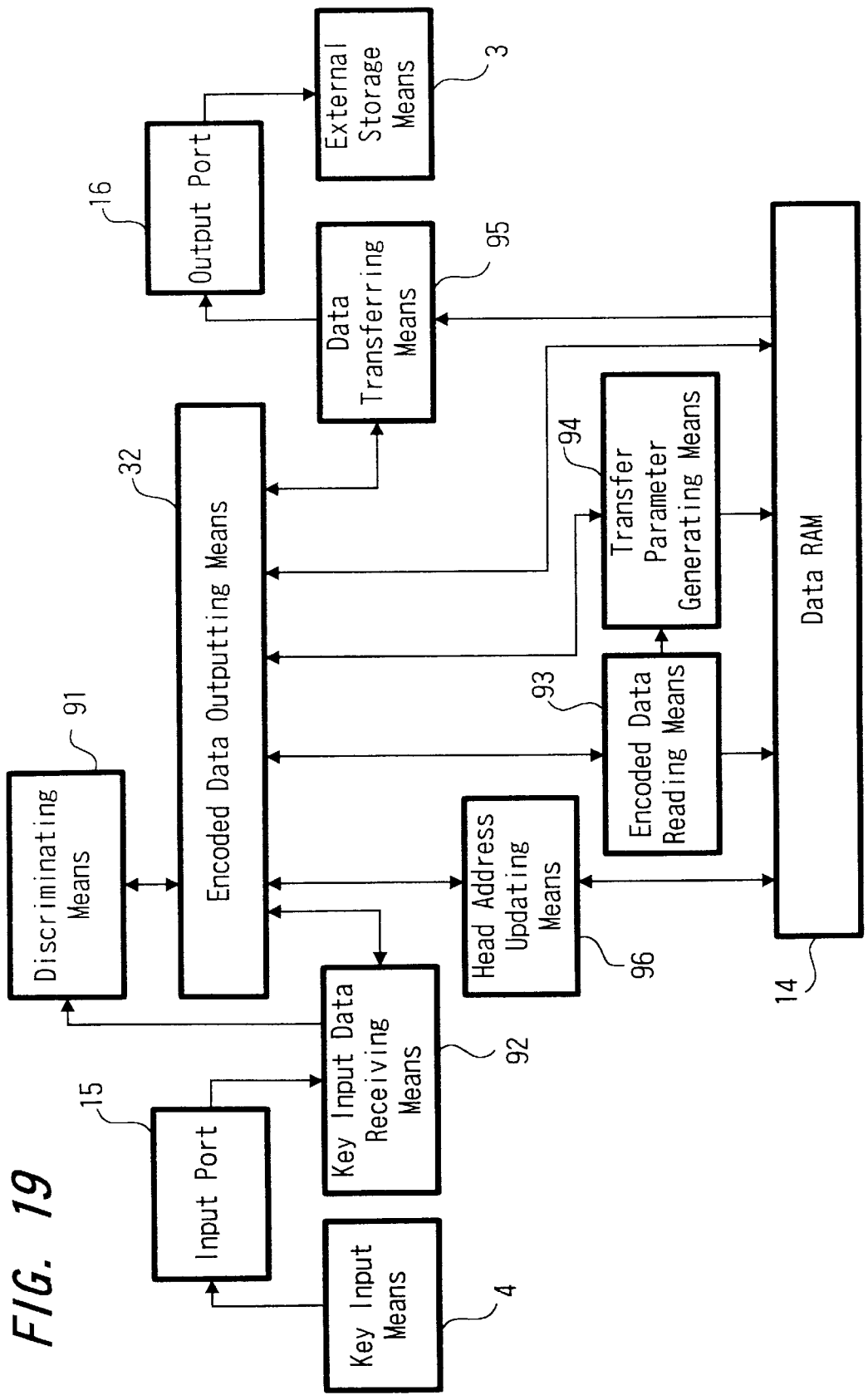
FIG. 19 is a diagram showing functional blocks of an encoded data outputting means of the data edition means.

As shown in FIG. 19 which is a diagram showing functional blocks of the encoded data output means 32, the encoded data outputting means 32 has a discriminating means 91 for carrying out various discrimination operations, a key input data receiving means 92 for receiving the key input data from the key input means 4 through the input port 15 to supply it to the discriminating means 91, an encoded data reading means 93 for successively reading the encoded data da from the encoded data file by a predetermined transfer data length T (e.g., 1024 bytes), a transfer parameter generating means 94 for generating a transfer parameter used for transferring the read-out encoded data da to the external storage apparatus 3, a data transfer means 95 for transferring the generated transfer parameter to the external storage apparatus 3 through the output port 16, and a head address updating means 96 for updating a head logical address relative to the external storage apparatus 3.

Figure 20:
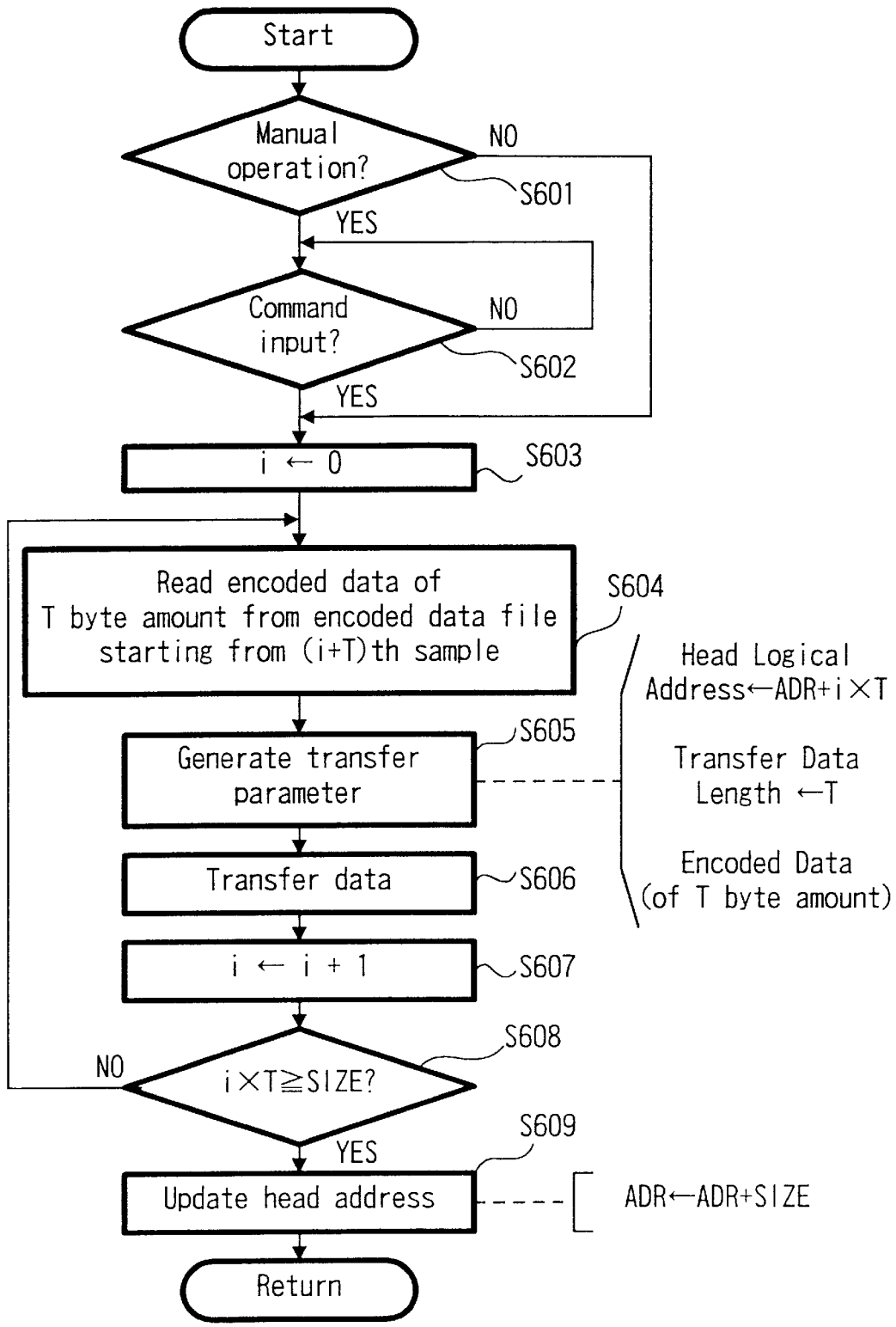
FIG. 20 is a diagram showing functional blocks of the encoded data outputting means of the data edition means.

As shown in FIG. 20 which is a flowchart used to explain a processing of an encoded data outputting subroutine (i.e., an operation of the encoded data outputting means 32), in step S601, the discriminating means 91 discriminates whether an operation of the encoded data outputting means 32 is started manually or automatically. This discrimination is carried out by discriminating contents of the key input data input from a automatic/manual changeover switch of the key input means 4, for example.

If it is determined in step S601 that the operation is started manually, then the processing proceeds to step S602, wherein the discriminating means 91 discriminates whether or not the operation is to be started. This discrimination is carried out by discriminating whether or not a command data indicative of "start of operation" is input from the key input means 4. The processing in step S602 is repeatedly carried out until the input of the command data. Specifically, the processing of the encoded data outputting means 32 does not proceed until the command data is input.

If it is determined in step S602 that the command data is input, then the processing proceeds to step S603. If it is determined in step S601 that the operation is started automatically, then the processing proceeds directly from step S301 to step S603.

In step S603, an initial value "0" is stored in the index register i, thereby the index register i being initialized.

The processing proceeds to step S604, wherein the encoded data reading means 93 reads out the encoded data da of a T-byte amount from the encoded data file starting from an address (i.e., (i×T)th byte) indicated by a multiplied value of the value of the index register i and the transfer data length T (=1024 bytes).

Then, the processing proceeds to step S605, wherein the transfer parameter generating means 94 generates the transfer parameter used for transferring the audio data Da to the external storage apparatus 3. Specifically, at least the head logical address of the encoded data da to be stored in the external storage apparatus 3, the transfer data length and the encoded data da (of the T-byte amount) to be practically transferred are stored in the transfer parameter storage area of the data RAM 14. The head logical address is obtained by adding the multiplied value of the value of the index register i and the transfer data length T with a value of a register ADR (initial value=0) in which the previous head logical address is stored.

The processing proceeds to step S606, wherein the data transfer means 95 transfers the transfer parameter stored in the transfer parameter storage area of the data RAM 14 to the external storage apparatus 3 through the output port 16.

The external storage apparatus 3 initially writes, based on the transfer parameter input from the encoding apparatus 2, the encoded data da of the T-byte amount added after the transfer parameter in a portion starting from a physical address corresponding to the head logical address.

The processing proceeds to step S607, wherein the value of the index register i is updated by +1. The processing proceeds to step S608, wherein it is discriminated whether or not all the encoded data da stored in the encoded data file have already been transferred. This discrimination is carried out by discriminating whether or not the multiplied value of the value of the index register i and the transfer data length is equal to or larger than a value stored in a register SIZE (a value of a data size of an encoded data).

If it is determined in step S608 that the multiplied value is smaller than the value stored in the register SIZE, then the processing returns to step S604 and the processings in step S604 and the succeeding steps are carried out. Specifically, the encoded data da of an amount of the next transfer data length is read out from the encoded data file and the transfer parameter for the encoded data da is generated and transferred to the external storage apparatus 3.

If it is determined in step S608 that the multiplied value is equal to or larger than the value stored in the register SIZE, i.e., if it is determined that all the encoded data da stored in the encoded data file have already been transferred, then the processing proceeds to step S609, wherein the head address updating means 96 updates the head logical address of the encoded data da to be stored in the external storage apparatus 3. This updating operation is carried out by storing an added value of the value of the register ADR (the head logical address at this time) and the value of the register SIZE (the data size of the encoded data at this time) in the register ADR.

When the processing in step S609 is finished, the processing of the encoded data outputting subroutine (the operation of the encoded data outputting means 32) is ended.

Returning to the main routine shown in FIG. 8, the processing of the data edition means 31 proceeds to step S16, wherein the discriminating means 22 discriminates whether or not the bit indicative of "lend" of the start/end discriminating flag is "1". The bit setting means 43 of the time code monitoring means 24 operating in a time sharing system together with the data edition means 21 sets the bit indicative of "end" of the start/end discriminating flag when the time indicated by the time code Ct input to the encoding apparatus 2 becomes equal to the end time (time data input through the key input means 4).

If it is determined in step S16 that the time indicated by the input time code Ct is not the end time and hence the processing should not be finished at the present time, then the processing returns to step S10 and thereafter the processings in step S10 and the succeeding steps are repeated. Specifically, the data (audio data Da) reproduced from the magnetic tape newly loaded onto the digital ATR 1 is trimmed and encoded and the encoded data is transferred to the external storage apparatus 3. At this time, the present encoded data da is written in a storage area of the external storage apparatus 3 from an address next to that of the encoded data da previously transferred.

If it is determined in step S16 that the time indicated by the input time code Ct is the end time and hence the processing should be finished at the present time, then the processing proceeds to step S17. At this time, the processing or encoding the audio data Da of a video data has been completed.

In step S17, the discriminating means 22 discriminates whether or not a program end request is received. This discrimination is carried out by discriminating whether or not an end request interruption occurs due to the de-energizing of the encoding apparatus 2.

If it is determined in step S17 that the program end request is not received, then the processing returns to step S5 and thereafter the operation of encoding audio data Da of another video data is started. If on the other hand it is determined in step S17 that the program end request is received, then the processing of the data edition means 31 is ended.

As described above, when in the encoding apparatus 2 according to this embodiment the reproduced data (audio data) supplied from separate magnetic tape and sharing the common continuous time code are divided into data of audio frame units and the encoder circuit 17 encodes the divided data, the time code framing arithmetic means 63, the audio frame calculating means 64 and the frame sample value calculating means 65 of the phase-difference calculating means 29 convert the time code Ct input to the encoding apparatus 2 from the digital ATR 1 and the audio frame Cau corresponding to the time code Ct into the audio sample values WD.

Specifically, when the data reproduced from the magnetic tapes are input to the encoding apparatus 2, the time code Ct supplied together with the audio data Da is read. The time code framing arithmetic means 64 converts the read time code Ct into the time code frame Ctc, and then the frame sample value calculating means 64 converts the time code frame Ctc into the audio sample value WD. At this time, the audio frame Cau of the audio data Da obtained by reproducing the data from the magnetic tapes are also converted into a numerical value at the same time, i.e., into the audio sample value WD.

Based on the audio sample value WD of the time code frame Ctc and the audio sample value WD of the audio frame Cau corresponding to the time code frame Ctc, the phase-difference sample value calculating means 66 calculates the phase difference P (sample value) between the time code Ct and the corresponding audio frame Cau.

Then, the trimming means 30 at the succeeding stage trims (removes) the audio data from a portion corresponding to an input time of the time code Ct with respect to the magnetic tape to the start point of the audio frame Cau corresponding to the time code Ct.

After the reproduced data (audio data) successively supplied from the first and second magnetic tapes are subjected to the above-mentioned processings, the new start point of the audio data Da of the trimmed second magnetic tape is synchronized with the audio frame Cau having the same value of the first magnetic tape.

Therefore, the trimmed data reading means 83 of the encoding means 31 outputs the trimmed audio data Da to the encoder circuit 17. In this case, the encoder circuit 17 is continuously supplied initially with the audio frame Cau with respect to the audio data Da of the first magnetic tape and subsequently with the audio frame Cau with respect to the audio data Da of the second magnetic tape.

According to this embodiment, when the audio data Da from the first magnetic tape are supplied to the encoder circuit 17 by an audio frame unit, the audio frame Cau excluding a so-called "margin" is stored as the encoding end point and the encoding start point (audio frame) of the audio data Da recorded on the second magnetic tape is calculated based on the above encoding end point, thereby the audio data Da from a portion corresponding to the encoding start point are supplied to the encoder circuit 17 by an audio frame unit. Therefore, assuming that the encoding end point of the audio data Da recorded on the first magnetic tape is the Nth audio frame, then the encoder circuit 17 is continuously supplied initially with the Nth audio frame of the first magnetic tape and subsequently with the (N+1)th audio frame included in the audio data Da recorded on the second magnetic tape.

While in the above embodiment the audio data Da reproduced from the first magnetic tape and the audio data Da reproduced from the second magnetic tape are successively supplied to the encoder circuit 17 by an audio frame unit, the present invention is not limited thereto and an audio data Da reproduced from the kth magnetic tape and an audio data Da reproduced from the (k+1)th magnetic tape are successively supplied to the encoder circuit 17 by an audio frame unit.

As described above, after the encoded data da (whose last audio frame=the Nth audio frame) obtained from the reproduced data of the kth magnetic tape is written in the external storage apparatus 3, the encoded data da (whose head frame=the (N+1)th audio frame) obtained from the reproduced data of the (k+1)th magnetic tape is written therein.

While in this embodiment the reproduced data from the first magnetic tape and the reproduced data from the second magnetic tape are continuously connected to each other by the audio frame unit, the present invention is not limited thereto and if the encoded data has already been written in the external storage apparatus 3, then it is possible to replace an optional audio frame written therein with an audio frame having the same value.

In this case, based on the audio sample value indicative of the time code Ct including the audio frame Cau to be connected of the reproduced data from the second magnetic tape and the audio sample value of the audio frame Cau corresponding to the time code Ct, the phase-difference calculating means 29 calculates the phase difference P (sample value) between the time code Ct and the audio frame Cau.

The trimming means 30 trims the audio data Da prior to the above audio frame based on the calculated phase difference P (sample value). Further, the trimmed data reading means 83 of the encoding means 31 outputs the trimmed audio data Da to the encoder circuit 17. As a result, the encoded data synchronized with the audio frame already written in the external storage apparatus 3 is obtained and hence it is possible to replace the encoded data already written therein with the newly encoded data by overwriting the newly encoded data on a portion of the external storage apparatus 3 where the encoded data of the audio frame having the same value is already written.

According to the present invention, it is possible to insert an optional audio frame of the reproduced data from the second magnetic tape between optional audio frames of the reproduced data from the first magnetic tape, e.g., between the jth audio frame and the (j+1)th audio frame thereof.

In this case, initially the reproduced data from the first magnetic tape is encoded up to the jth audio frame and the jth audio frame is stored as the encoding end point. Subsequently, the reproduced data from the second magnetic tape is encoded. At this time, based on the audio sample value of the time code including the audio frame to be connected next to the jth audio frame and the audio sample value of the audio frame corresponding to the time code, the phase-difference calculating means 29 calculates the phase difference P (sample value) between the time code and the audio frame.

Based on the calculated phase difference P (sample value), the trimming means 30 trims the audio data prior to the above audio frame. The trimmed data reading means 83 of the encoding means 31 outputs the trimmed audio data to the encoder circuit 17. As a result, it is possible to continuously connect the audio data of the audio frames (e.g., the mth to (m+k)th audio frames) to be connected of the reproduced data from the second magnetic tape, next to the jth audio frame of the reproduced data from the first magnetic tape. In this case, the (m+k)th audio frame is newly stored as the encoding end point.

After the audio data of the audio frames (e.g., the mth to (m+k)th audio frames), which are to be connected next to the above jth audio frame, of the reproduced data from the second magnetic tape, the first magnetic tape is loaded onto the digital ATR 1 again and reproduction thereof is started.

Then, based on the audio sample value of the time code including the (j+1)th audio frame to be connected next to the above (m+k)th audio frame and the audio sample value corresponding to the time code, the phase-difference calculating means 29 calculates phase difference P (sample value) between the time code and the audio frame.

The trimming means 30 trims the audio data Da of the audio frames prior to the (j+1)th audio frame based on the calculated phase difference P. Further, the trimmed data reading means 83 of the encoding means 31 outputs the trimmed audio data to the encoder circuit 17. As a result, it is possible to continuously connect the audio data of the (j+1)th audio frame to be connected of the reproduced data from the first magnetic tape, next to the (m+k)th audio frame of the reproduced data from the second magnetic tape.

As a result, it is possible to continuously connect the mth to (m+k)th audio frames of the reproduced data from the second magnetic tape between the jth audio frame of the reproduced data from the first magnetic tape and the (j+1)th audio frame thereof.

As described above, according to the data processing apparatus and the data processing method of the present invention, the data processing apparatus for (or the data processing method of) dividing the information data supplied together with the reference timing while a plurality of sources are switched into data of a predetermined processing unit to encode the divided data includes a timing numeric-representing means (or a timing numeric-representing step) for converting the reference timing and a start timing of a processing unit at the reference timing into numerical values, a phase-difference calculating means (or a phase-difference calculating step) for calculating a phase difference of a newly replaced source between the reference timing and a start timing of a processing unit based on a numerical value information from the above timing numeric-representing means, a trimming means (or a trimming step) for trimming information data from the start point of the information data of the newly replaced source to the start timing of the above processing unit based on the phase-difference information, and a processing-unit outputting means (or a processing-unit outputting step) for outputting the trimmed information data to the encoding means by a processing unit. The data processing apparatus (or the data processing method) achieves the following effects.

Specifically, when the information data supplied together with the reference timing while a plurality of sources are switched are divided into data of a predetermined unit and the divided data are encoded, it is possible to keep continuity of the processing units used for the encoding at the point where sources are switched and to divide the source at an optional point regardless of a silent portion and so on.

Moreover, it is possible to substitute an optional processing unit for an optional portion of a group of continuous processing units.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A data processing apparatus for encoding a data stream generated by switching among data supplied from a plurality of sources, the data from each source including time information and being partitioned into a plurality of data units, the apparatus comprising:

means for generating a start time for each said data unit based on said time information;

means for generating a phase difference between first data from a first one of said sources and second data from a second one of said sources when data to be encoded is generated by switching from said first source to said second source, the point within said first data at which said first data is switched off being the first switch point and the point within said second data at which said second data is switched on being the second switch point, said phase difference being indicative of the difference in time of occurrence between the supply of a first data unit of said first data corresponding to said first switch point and the supply of a second data unit of said second data, such that when said first data ending with said first data unit is concatenated with said second data beginning with said second data unit the resulting data stream has a continuous phase characteristic;

means for trimming from said second data the data between said second switch point and said second data unit to generate trimmed second data in preparation for said concatenation; and means for concatenating said first data ending with said first data unit and said trimmed second data to form said data stream, and for outputting said data stream to an encoding means.

2. The apparatus according to claim 1, wherein said time information includes a time code and said data unit start times are generated based on said time code.

3. The apparatus according to claim 1, wherein said second switch point is located within said second data unit.

4. The apparatus according to claim 1, wherein when said time information for said first data and said time information for said second data are synchronized, and said phase difference is generated based on the difference between the start time of a first data unit of said first data corresponding to said first switch point and the time information corresponding to said second switch point.

5. The apparatus according to claim 1, wherein when said time information for said first data and said time information for said second data are not synchronized and said phase difference is generated based on the difference between the start time of a first data unit of said first data corresponding to said first switch point and the start time of a second data unit of said second data corresponding to said second switch point.

6. The apparatus according to claim 1, wherein said phase difference generation is based on information concerning a periodicity of said time information for each of said first data and said second data.

7. The apparatus according to claim 1, wherein said first data and said second data are digital data and said phase difference is indicative of a number of digital samples representing the difference in time of occurrence between the supply of said first data unit of said first data corresponding to said first switch point and the supply of said second data unit of said second data.

8. The apparatus according to claim 1, wherein said first data and said second data are audio data and said time information includes information concerning the frame timing of video data.

9. A data processing method for encoding a data stream generated by switching among data supplied from a plurality of sources, the data from each source including time information and being partitioned into a plurality of data units, the method comprising the steps of:

generating a start time for each said data unit based on said time information;

generating a phase difference between first data from a first one of said sources and second data from a second one of said sources when data to be encoded is generated by switching from said first source to said second source, the point within said first data at which said first data is switched off being the first switch point and the point within said second data at which said second data is switched on being the second switch point, said phase difference being indicative of the difference in time of occurrence between the supply of a first data unit of said first data corresponding to said first switch point and the supply of a second data unit of said second data, such that when said first data ending with said first data unit is concatenated with said second data beginning with said second data unit the resulting data stream has a continuous phase characteristic;

trimming from said second data the data between said second switch point and said second data unit to generate trimmed second data in preparation for said concatenation; and concatenating said first data ending with said first data unit and said trimmed second data to form said data stream, and outputting said data stream to an encoding means.

10. The method according to claim 9, wherein said time information includes a time code and said data unit start times are generated based on said time code.

11. The method according to claim 9, wherein said second switch point is located within said second data unit.

12. The method according to claim 9, wherein when said time information for said first data and said time information for said second data are synchronized, and said phase difference is generated based on the difference between the start time of a first data unit of said first data corresponding to said first switch point and the time information corresponding to said second switch point.

13. The method according to claim 9, wherein when said time information for said first data and said time information for said second data are not synchronized and said phase difference is generated based on the difference between the start time of a first data unit of said first data corresponding to said first switch point and the start time of a second data unit of said second data corresponding to said second switch point.

14. The method according to claim 9, wherein said phase difference generation is based on information concerning a periodicity of said time information for each of said first data and said second data.

15. The method according to claim 9, wherein said first data and said second data are digital data and said phase difference is indicative of a number of digital samples representing the difference in time of occurrence between the supply of said first data unit of said first data corresponding to said first switch point and the supply of said second data unit of said second data.

16. The method according to claim 9, wherein said first data and said second data are audio data and said time information includes information concerning the frame timing of video data.

17. A data processing apparatus for encoding video data and an audio data stream, said audio data stream being generated by switching among audio data supplied from a plurality of audio sources, the audio data from each source being associated with time information and being partitioned into a plurality of data units, the apparatus comprising:

means for generating a start time for each said data unit based on said time information;

means for generating a phase difference between first data from a first one of said audio sources and second data from a second one of said audio sources when audio data to be encoded is generated by switching from said first source to said second source, the point within said first data at which said first data is switched off being the first switch point and the point within said second data at which said second data is switched on being the second switch point, said phase difference being indicative of the difference in time of occurrence between the supply of a first data unit of said first data corresponding to said first switch point and the supply of a second data unit of said second data, such that when said first data ending with said first data unit is concatenated with said second data beginning with said second data unit the resulting data stream has a continuous phase characteristic;

means for trimming from said second data the data between said second switch point and said second data unit to generate trimmed second data in preparation for said concatenation; and means for concatenating said first data ending with said first data unit and said trimmed second data to form said data stream, and for outputting said data stream and said video data to an encoding means.

18. A data processing apparatus for encoding video data and an audio data stream, said audio data stream being generated by switching among audio data supplied from a plurality of audio sources, the audio data from each source being associated with time information and being partitioned into a plurality of data units, the apparatus comprising:

means for generating a start time for each said data unit based on said time information;

means for generating a phase difference between first data from a first one of said audio sources and second data from a second one of said audio sources when audio data to be encoded is generated by switching from said first source to said second source, the point within said first data at which said first data is switched off being the first switch point and the point within said second data at which said second data is switched on being the second switch point, said phase difference being indicative of the difference in time of occurrence between the supply of a first data unit of said first data corresponding to said first switch point and the supply of a second data unit of said second data such that when said first data ending with said first data unit is concatenated with said second data beginning with said second data unit the resulting data stream has a continuous phase characteristic;

means for trimming from said second data the data between said second switch point and said second data unit to generate trimmed second data in preparation for said concatenation;

means for concatenating said first data ending with said first data unit and said trimmed second data to form said data stream, and for outputting said data stream and said video data to an encoding means; and means for multiplexing said encoded data stream and said encoded video data.

\* \* \* \* \*